United States Patent [19]
Ishida

[11] Patent Number: 5,708,341
[45] Date of Patent: Jan. 13, 1998

[54] CONTROL APPARATUS AND METHOD WITH CORRECTION OF TRIAL MANIPULATED PATTERN

[75] Inventor: Tsutomu Ishida, Osaka, Japan

[73] Assignee: Omron Corporation, Kyoto, Japan

[21] Appl. No.: 539,695

[22] Filed: Oct. 5, 1995

[30] Foreign Application Priority Data

Oct. 7, 1994 [JP] Japan .................. 6-244182

[51] Int. Cl.[6] .................. G05B 13/02
[52] U.S. Cl. .................. 318/561; 318/600; 318/610; 364/164; 364/148
[58] Field of Search .................. 318/560, 561, 318/600–610, 798–802, 807–811; 364/148–151, 158–166; 395/80, 81, 85

[56] References Cited

U.S. PATENT DOCUMENTS

| | | |
|---|---|---|
| 5,119,287 | 6/1992 | Nakamura et al. . |
| 5,245,528 | 9/1993 | Saito et al. .................. 364/161 |
| 5,245,830 | 9/1993 | Aubrun et al. . |
| 5,453,676 | 9/1995 | Agrotis et al. .................. 318/643 |

FOREIGN PATENT DOCUMENTS

| | | |
|---|---|---|
| 0 483 364 | 4/1991 | European Pat. Off. . |
| 64-19219 | 1/1989 | Japan . |

*Primary Examiner*—Brian Sircus
*Attorney, Agent, or Firm*—Dickstein Shapiro Morin & Oshinsky LLP

[57] ABSTRACT

A PID controller roughly controls several times of trial operations preceding an actual operation. A trial operation analyzing unit analyzes and learns the trial operations conducted under the control of the PID controller, thereby generating a criterial manipulated pattern that serves as a criterion of a time-series pattern of a manipulated variable in the actual operation. An actual operation controller controls the actual operation on the basis of the criterial manipulated pattern thus generated. An operation changeover switch changes over between the PID controller to the actual operation controller in accordance with the state of operation, i.e., the trial operation or actual operation. Thus, the control apparatus itself learns the trial operations, and can self-acquire the criterial manipulated pattern for the actual operation. That is, a suitable criterial manipulated pattern can be generated easily.

10 Claims, 17 Drawing Sheets

AVERAGE RISE TIME (TAV)

ADVANCING AMOUNT

OVERSHOOT

REDUCTION RATIO

CONTROL APPARATUS AND METHOD WITH CORRECTION OF TRIAL MANIPULATED PATTERN

BACKGROUND OF THE INVENTION

1. Field of the Invention

The invention relates to a control apparatus and a control method, and particularly to facilitated determination of a transfer element.

2. Description of the Related Art

In a plant or the like, a two-degree-of-freedom controller is used as a control apparatus. FIG. 18 shows the configuration of a conventional two-degree-of-freedom controller 2 in terms of a transfer function according to the Laplace transform. The conventional two-degree-of-freedom controller 2 controls a plant 10 by giving a manipulated variable U(s) to the plant 10, so that a controlled variable Y(s) indicative of the state of the plant rapidly approaches a target or desired value R(s).

To this end, the two-degree-of-freedom controller 2 comprises a feedfoward element 4 in addition to a detection element 6 and a feedback element 8. In FIG. 18, the transfer function of the feedfoward element 4 is indicated by GR(s), that of the detection element 6 by H(s), and that of the feedback element 8 by GC(s). The transfer function of the plant 10 is indicated by G(s).

The feedforward element 4 is a transfer element which, when there is no disturbance D(s) and noise N(s), receives the target value R(s) and outputs a manipulated variable that can be expected to control the plant 10 in an open loop.

The detection element 6 detects the controlled variable Y(s), and feeds back the detection result to the input side of the feedback element 8. The feedback element 8 is a transfer element which receives the difference between the target value R(s) and the detection result and outputs a manipulated variable.

According to this configuration, corresponding to the target value R(s) which is an input, the feedfoward element 4 can output a manipulated variable which is previously set and seemed to be optimum. Therefore, unlike a PID controller (a controller consisting of only a feedback element configured by proportional, integral, and differential elements) 12 which is not provided with a feedfoward element as shown in FIG. 19, the controller can rapidly perform a predictive control which conforms to the characteristics of the plant 10.

Even when disturbance D(s) or noise N(s) is produced, the provision of the feedback loop consisting of the detection element 6 and the feedback element 8 can offset effects of the disturbance is noise.

However, the conventional two-degree-of-freedom controller 2 has problems as discussed below. The transfer function of the whole of the control system including the two-degree-of-freedom controller 2 and the plant 10 shown in FIG. 18 can be expressed by the following equation:

$$Y(s)=WRY(s)\cdot R(s)+WDY(s)\cdot D(s)-WNY(s)\cdot N(s) \quad (a)$$

where WRY(s), WDY(s), and WNY(s) are composite transfer functions of the target value R(s) and the controlled variable Y(s), the disturbance D(s) and the controlled variable Y(s), and the noise N(s) and the controlled variable Y(s), and can be expressed by the following equations, respectively:

$$WRY(s)=\{GC(s)+GR(s)\}\cdot G(s)/\{1+GC(s)\cdot G(s)\cdot H(s)\}$$

$$WDY(s)=G(s)/\{1+GC(s)\cdot H(s)\}$$

$$WNY(s)=GC(s)\cdot G(s)\cdot H(s)/\{1+GC(s)\cdot G(s)\cdot H(s)\} \quad (b)$$

On the other hand, the transfer function of the whole of a control system including the PID controller 12 and the plant 10 shown in FIG. 19 can be expressed by the following expression:

$$Y2(s)=WRY2(s)\cdot R(s)+WDY2(s)\cdot D(s)-WNY2(s)\cdot N(s) \quad (c)$$

where WRY2(s), WDY2(s), and WNY2(s) are composite transfer functions of the target value R(s) and the controlled variable Y2(s), the disturbance D(s) and the controlled variable Y2(s), and the noise N(s) and the controlled variable Y2(s), and can be expressed by the following equations, respectively:

$$WRY2(s)=GC(s)\cdot G(s)/\{1+GC(s)\cdot G(s)\cdot H(s)\}$$

$$WDY2(s)=G(s)/\{1+GC(s)\cdot G(s)\cdot H(s)\}$$

$$WNY2(s)=GC(s)\cdot G(s)\cdot H(s)/\{1+GC(s)\cdot G(s)\cdot H(s)\} \quad (d)$$

All the three composite transfer functions of the PID control system expressed as Eq. (d) are functions consisting of only GC(s), G(s), and H(s). Assuming that G(s) and H(s) are fixed transfer functions peculiar to the system, when the transfer function GC(s) of the feedback element is once determined, the three composite transfer functions WRY2(s), WDY2(s), and WNY2(s) are uniquely defined.

In other words, when only the transfer function GC(s) of the feedback element is determined, the control characteristics of the PID controller 12 shown in FIG. 19 can uniquely be defined.

Among the three composite transfer functions of the two-degree-of-freedom control system expressed as Eq. (b), both WDY(s) and WNY(s) are functions consisting of only GC(s), G(s), and H(s), but WRY(s) further includes FR(s). Assuming that G(s) and H(s) are fixed transfer functions peculiar to the system, when the transfer function GC(s) of the feedback element is once determined, WDY(s) and WNY(s) of the three composite transfer functions can uniquely be defined. In order to define WRY(s), however, it is required to further determine the transfer function GR(s) of the feedfoward element 4.

In other words, unlike in the case of the PID controller 12 shown in FIG. 19, in the two-degree-of-freedom controller 2 shown in FIG. 18, it is impossible to uniquely define the control characteristics unless the transfer function GC(s) of the feedback element 8 is determined and also the transfer function GR(s) of the feedfoward element 4 is determined.

Therefore, where both the feedback element 8 and the feedfoward element 4 consist of the three elements, or proportional, integral, and differential elements, it is required to adjust six parameters in total in order to determine the transfer functions GC(s) and GR(s). This causes the operation of determining the transfer elements such as the feedback element 8 and the feedfoward element 4, to be very cumbersome.

Japanese Unexamined Patent Publication No. Sho. 64-19219 entitled "Automatic Burner Control Apparatus Having a Learning Function" relates to the invention. According to this technique, a manipulated signal in a trial operation and a corresponding controlled variable are stored, based on which information a rule for determining an optimum manipulation sequence for a control object is generated. The optimum manipulation sequence is determined by using the thus-determined rule.

SUMMARY OF THE INVENTION

It is an object of the present invention to provide a control apparatus and a control method which can solve the problems of prior art controllers such as a two-degree-of-freedom controller and easily determine a transfer element.

According to the invention, there is provided a control apparatus comprising trial pattern holding means for holding a trial controlled pattern that is a time-series pattern of the controlled variable in a trial operation that is performed prior to an actual operation, and a trial manipulated pattern that is a time-series pattern of the manipulated variable corresponding to the trial controlled pattern; trial evaluation characteristic value extracting means for extracting a trial evaluation characteristic value for evaluating the trial operation, from the target controlled pattern and the trial controlled pattern; criterial manipulated pattern generating means for correcting the trial manipulated pattern on the basis of the trial evaluation characteristic value so that the trial controlled pattern approaches the target controlled pattern, and for holding the corrected trial manipulated pattern as a criterial manipulated pattern that serves as a criterion of a time-series pattern of a manipulated variable in the actual operation; and criterial manipulated pattern outputting means for outputting the criterial manipulated pattern as at least part of the manipulated variable in the actual operation.

The control apparatus may be constructed such that the criterial manipulated pattern generating means calculates, by fuzzy inference, a trial correcting value that is necessary to correct the trial manipulated pattern on the basis of the trial evaluation characteristic value so that the trial controlled pattern approaches the target controlled pattern, corrects the trial manipulated pattern on the basis of the trial correcting value, and holds the corrected trial manipulated pattern as the criterial manipulated pattern.

The control apparatus may further comprise a feedback circuit dedicated to the trial operation, and may be constructed such that in the trial operation, the trial operation feedback circuit is connected to the control object whereas the criterial manipulated pattern outputting means is disconnected from the control object, and in the actual operation the criterial manipulated pattern outputting means is connected to the control object whereas the trial operation feedback circuit is disconnected from the control object.

The control apparatus may be constructed such that only the criterial manipulated pattern is supplied to the control object as the manipulated variable in the actual operation.

The control apparatus may be constructed such that a feedback signal generated based on the controlled variable and the criterial manipulated pattern are supplied to the control object as the manipulated variable in the actual operation.

According to the invention, there may be provided a control method comprising the steps of obtaining a trial controlled pattern that is a time-series pattern of a controlled variable in a trial operation that is performed prior to an actual operation, and a trial manipulated pattern that is a time-series pattern of the manipulated variable corresponding to the trial controlled pattern; extracting a trial evaluation characteristic value for evaluating the trial operation, from the target controlled pattern and the trial controlled pattern; correcting the trial manipulated pattern on the basis of the trial evaluation characteristic value so that the trial controlled pattern approaches the target controlled pattern, and holding the corrected trial manipulated pattern as a criterial manipulated pattern that serves as a criterion of a time-series pattern of a manipulated variable in the actual operation; and outputting the criterial manipulated pattern as at least part of the manipulated variable in the actual operation.

In the first embodiment, the trial operation feedback circuit corresponds to a PID controller 22 in FIG. 1 showing the configuration of an aluminum extrusion controller 20. The trial pattern holding means corresponds to step S4 in FIGS. 4 and 5 which are a flowchart showing the operation of the aluminum extrusion controller 20, the trial evaluation characteristic value extracting means and the criterial manipulated pattern generating means correspond to steps S6 to S10, and the criterial manipulated pattern outputting means corresponds to step S14.

The trial operation feedback circuit is not restricted to the PID controller 22 in FIG. 1, and may be another feedback circuit such as a PI controller which conducts only the proportional and integral controls. Namely, the trial operation feedback circuit means a usual feedback circuit which, when the trial operation is to be conducted, is connected to the control object and, when the actual operation is to be conducted, is disconnected from the control object.

The trial pattern holding means is not restricted to means for executing step S4 in FIGS. 4 and 5 which are a flowchart showing the operation of the aluminum extrusion controller 20, and indicates usual means for holding a trial controlled pattern which is a time-series pattern of a controlled variable in a trial operation preceding an actual operation, and a trial manipulated pattern which is a time-series pattern of a manipulated variable corresponding to the trial controlled pattern.

The trial evaluation characteristic value extracting means and the criterial manipulated pattern generating means are not restricted to means for executing steps S6 to S10 in FIGS. 4 and 5, and indicate usual means for extracting a trial evaluation characteristic value for evaluating the trial operation, from the target controlled pattern and the trial controlled pattern.

The criterial manipulated pattern outputting means is not restricted to means for executing step S4 in FIGS. 4 and 5, and indicates usual means for outputting the criterial manipulated pattern as the manipulated variable in the actual operation.

In the control apparatus and the control method according to the invention, the trial manipulated pattern is corrected on the basis of the trial evaluation characteristic value which is extracted from the target controlled pattern, and the trial controlled pattern, the corrected trial manipulated pattern is held as the criterial manipulated pattern, and the manipulated variable is output on the basis of the criterial manipulated pattern.

Therefore, when the control apparatus itself learns the trial operation, it is possible to self-acquire the criterial manipulated pattern. Therefore, the user is not required to generate the criterial manipulated pattern.

Furthermore, it is possible to directly know a casual relationship between the trial manipulated pattern and the trial controlled pattern corresponding to the trial manipulated pattern. Therefore, even when the learning of the control apparatus itself is insufficient, the user can easily correct the trial manipulated pattern on the basis of the trial controlled pattern corresponding to the trial manipulated pattern.

The learning for generating the criterial manipulated pattern is conducted in a trial operation preceding an actual operation. Unlike the case where the learning is conducted in an actual operation, accordingly, the convergence properties of learning results are ensured.

In the control apparatus, the trial correcting value necessary to correct the trial manipulated pattern may be calculated by fuzzy inference.

In this case, the correction of the trial manipulated pattern in a trial operation can be established as a language rule.

In the control apparatus, the trial operation feedback circuit may be provided.

In this case, a trial operation can be conducted under a feedback control, and hence even a person who is not skilled in operation can conduct a trial operation with high reliability.

In the control apparatus, only the criterial manipulated pattern may be supplied to the control object as the manipulated variable in the actual operation.

In this case, in a plant or the like where disturbance can be neglected, a feedforward element can be set as a criterial manipulated pattern which is a time-series pattern of a manipulated variable, and an open loop can be formed only by the criterial manipulated pattern. Accordingly, a transfer element can be set only by generating a criterial manipulated pattern by means of learning.

In the control apparatus, a feedback signal that is generated based on the controlled variable and the criterial manipulated pattern may be supplied to the control object as the manipulated variable in the actual operation.

In this case, in a plant or the like where disturbance cannot be neglected, a feedforward element can be set as a criterial manipulated pattern which is a time-series pattern of a manipulated variable, and a two-degree-of-freedom control system can be formed by a criterial manipulated pattern and a feedback element. Independent from the feedback element, accordingly, the criterial manipulated pattern can be generated by means of learning.

DESCRIPTION OF THE PREFERRED EMBODIMENTS

Figure 1:
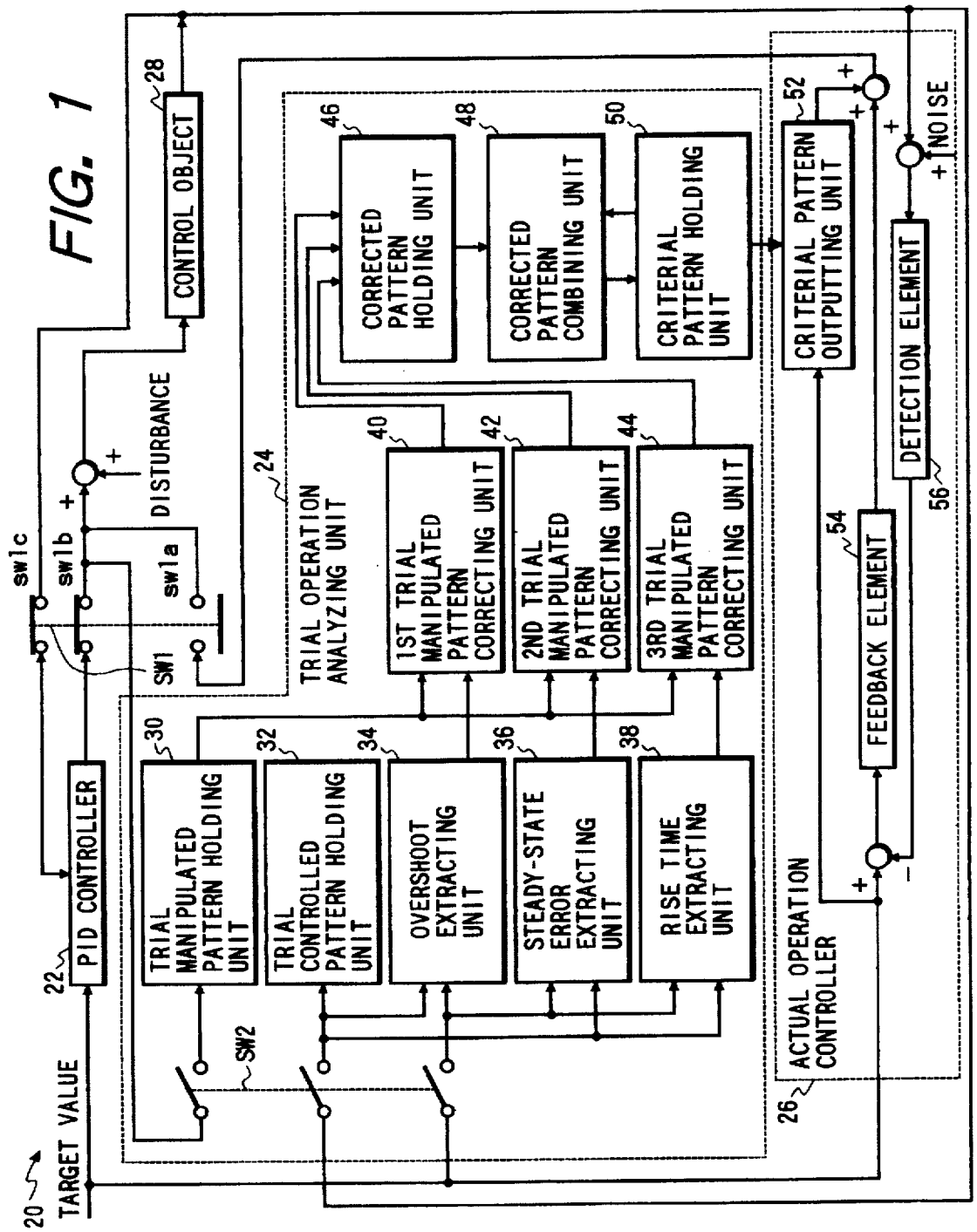
FIG. 1 is a block diagram showing the configuration of an aluminum extrusion controller 20 according to an embodiment of the present invention.

FIG. 1 shows the configuration of the aluminum extrusion controller 20 which is a control apparatus according to an embodiment of the invention. An aluminum extruder 60 (see FIG. 2) is used for extrusion-molding an aluminum bar. The aluminum extruder 60 is a machine in which an aluminum bar of a constant length is extruded by a pushing element called a ram (not shown) to pass through a die (not shown), thereby producing a bar having a given section shape corresponding to the shape of the die.

An aluminum bar of a constant length is supplied, extrusion molding is conducted by forward advancing the ram, and thereafter the ram is rearward moved to return to the original position. The series of operations is set as one cycle. A number of aluminum bars are subjected to extrusion molding by repeating the operations.

It is preferable that the extrusion speed of an aluminum bar be kept constant. The aluminum extrusion controller 20 of the embodiment is a controller which controls the aluminum extruder 60 so that an aluminum bar is extruded at a desired constant rate. The controller generally comprises a PID controller 22 which is the trial operation feedback circuit, a trial operation analyzing unit 24, an actual operation controller 26, and an operation changeover switch SW1.

The PID controller 22 is a controller which roughly controls several times of trial operations preceding the actual operation, and conducts the proportional, integral, and differential controls while feeding back data. The trial operation analyzing unit 24 analyzes and learns the trial operations conducted by the PID controller 22, thereby generating a criterial manipulated pattern which serves as a criterion of a time-series pattern of a manipulated variable in the actual operation.

The actual operation controller 26 controls the actual operation on the basis of the criterial manipulated pattern generated by the trial operation analyzing unit 24. The operation changeover switch SW1 changes over from the PID controller 22 to the actual operation controller 26 and vice versa in accordance with the state of the operation, i.e., a trial operation or an actual operation.

The trial operation analyzing unit 24 comprises: a trial manipulated pattern holding unit 30 and a trial controlled pattern holding unit 32 which function as the trial pattern holding means; an overshoot extracting unit 34, a steady-state error extracting unit 36, and a rise time extracting unit 38 which function as the trial evaluation characteristic value extracting means; a first trial manipulated pattern correcting unit 40, a second trial manipulated pattern correcting unit 42, a third trial manipulated pattern correcting unit 44, a corrected pattern holding unit 46, a corrected pattern combining unit 48, and a criterial pattern holding unit 50 which function as the criterial manipulated pattern generating means; and a sample capturing switch SW2.

The trial manipulated pattern holding unit 30 holds a time-series pattern of a manipulated variable which is an output of the PID controller 22 under a trial operation, i.e., the trial manipulated pattern for one cycle of the extrusion operation. In the embodiment, the trial manipulated pattern is expressed as a time-series pattern of an extrusion pressure instruction (U) instructing the valve opening of a hydraulic pump 62 of the aluminum extruder 60 (see FIG. 7).

The trial controlled pattern holding unit 32 holds a time-series pattern of a manipulated variable which is an output of a control object 28 under a trial operation, i.e., the trial controlled pattern for one cycle of the extrusion operation. In the embodiment, the trial controlled pattern is expressed as a time-series pattern of a ram speed (YR) indicative the extrusion speed of the ram (see FIG. 7).

The overshoot extracting unit 34 extracts an overshoot amount (OV) (see FIG. 7) that is an amount of the ram speed (YR) by which the ram speed exceeds an target extrusion speed (r) that is the target controlled pattern.

The steady-state error extracting unit 36 extracts a steady-state error (ES) (see FIG. 7) which is a difference between the steady-state ram speed (YS) that is an average ram speed in a period from an elapse of 50% of one cycle to that of 80%, and the target extrusion speed (r).

The rise time extracting unit 38 extracts an average rise time (TAV) (see FIG. 7) which is a time from an instant when the ram speed (YR) reaches 70% of the target extrusion speed (r) to that when the ram speed reaches 90% of the target extrusion speed.

The first trial manipulated pattern correcting unit 40 corrects the trial manipulated pattern held by the trial manipulated pattern holding unit 30, on the basis of the overshoot amount (OV) extracted by the overshoot extracting unit 34.

Similarly, the second trial manipulated pattern correcting unit 42 corrects the trial manipulated pattern on the basis of the steady-state error (ES), and the third trial manipulated pattern correcting unit 44 corrects the trial manipulated pattern on the basis of the average rise time (TAV).

The corrected pattern holding unit 46 holds the corrected trial manipulated patterns for the latest one cycle which are corrected by the first to third trial manipulated pattern correcting units 40, 42, and 44.

The corrected pattern combining unit 48 further combines the latest corrected trial manipulated pattern held by the corrected pattern holding unit 46, with the criterial manipulated pattern which is obtained by combining previous corrected trial manipulated patterns held by the criterial pattern holding unit 50.

The criterial pattern holding unit 50 holds the corrected trial manipulated pattern synthesized by the corrected pattern combining unit 48, as the criterial manipulated pattern.

The actual operation controller 26 comprises a criterial pattern outputting unit 52 which serves as the criterial manipulated pattern outputting means, a feedback element 54, and a detection element 56.

The criterial pattern outputting unit 52 outputs the criterial manipulated pattern held by the criterial pattern holding unit 50, as the criterion of a time-series pattern of a manipulated variable in the actual operation. That is, the criterial manipulated pattern corresponds to a feedforward element in the actual operation. In order to comply with disturbance and noise in the actual operation, a feedback loop is formed by the detection element 56 and the feedback element 54.

Figure 2:
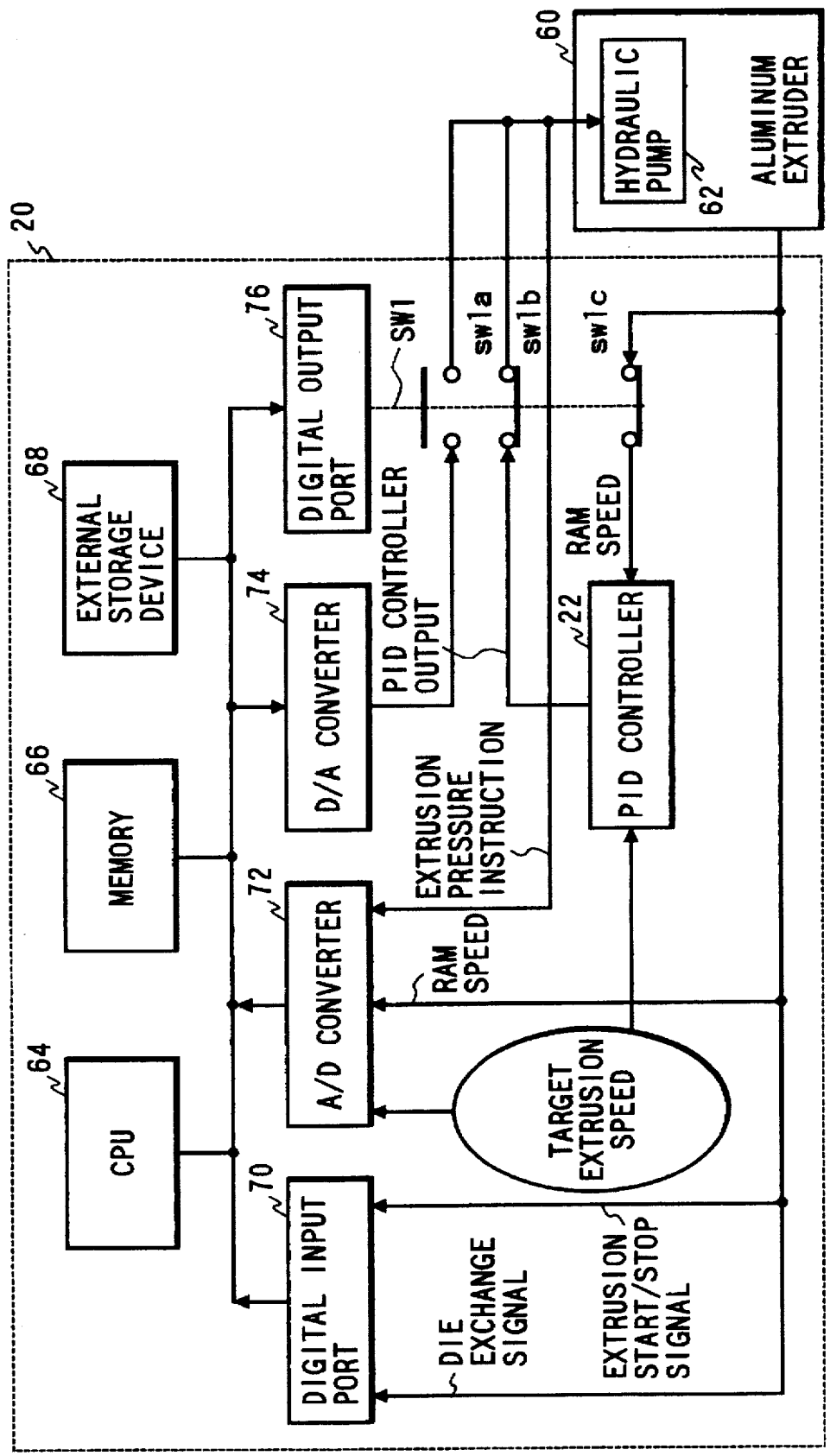
FIG. 2 is a block diagram showing the hardware configuration of the aluminum extrusion controller 20 in which a CPU is used.

FIG. 2 shows the hardware configuration of the aluminum extrusion controller 20 of the embodiment which is realized by using a CPU 64. Referring to FIG. 2, the aluminum extrusion controller 20 comprises the CPU 64 which performs a calculation process, a memory 66 which is a main storage device, an external storage device 68 which stores programs, etc. for aluminum extrusion, a digital input port 70 which is an input port for digital signals, a digital output port 76 which is an output port for digital signals, an A/D converter 72 which converts an analog signal input into a captured digital signal, a D/A converter 74 which converts a digital signal into an analog signal and outputs the analog signal, the PID controller 22, and the operation changeover switch SW1.

The CPU 64 plays the roles of the components shown in FIG. 1: the overshoot extracting unit 34, the steady-state error extracting unit 36, the rise time extracting unit 38, the first trial manipulated pattern correcting unit 40, the second trial manipulated pattern correcting unit 42, the third trial manipulated pattern correcting unit 44, the corrected pattern combining unit 48, the sample capturing switch SW2, the criterial pattern outputting unit 52, and the feedback element 54.

The memory 66 plays the roles of the trial manipulated pattern holding unit 30, the trial controlled pattern holding unit 32, the corrected pattern holding unit 46, and the criterial pattern holding unit 50.

Figure 3:
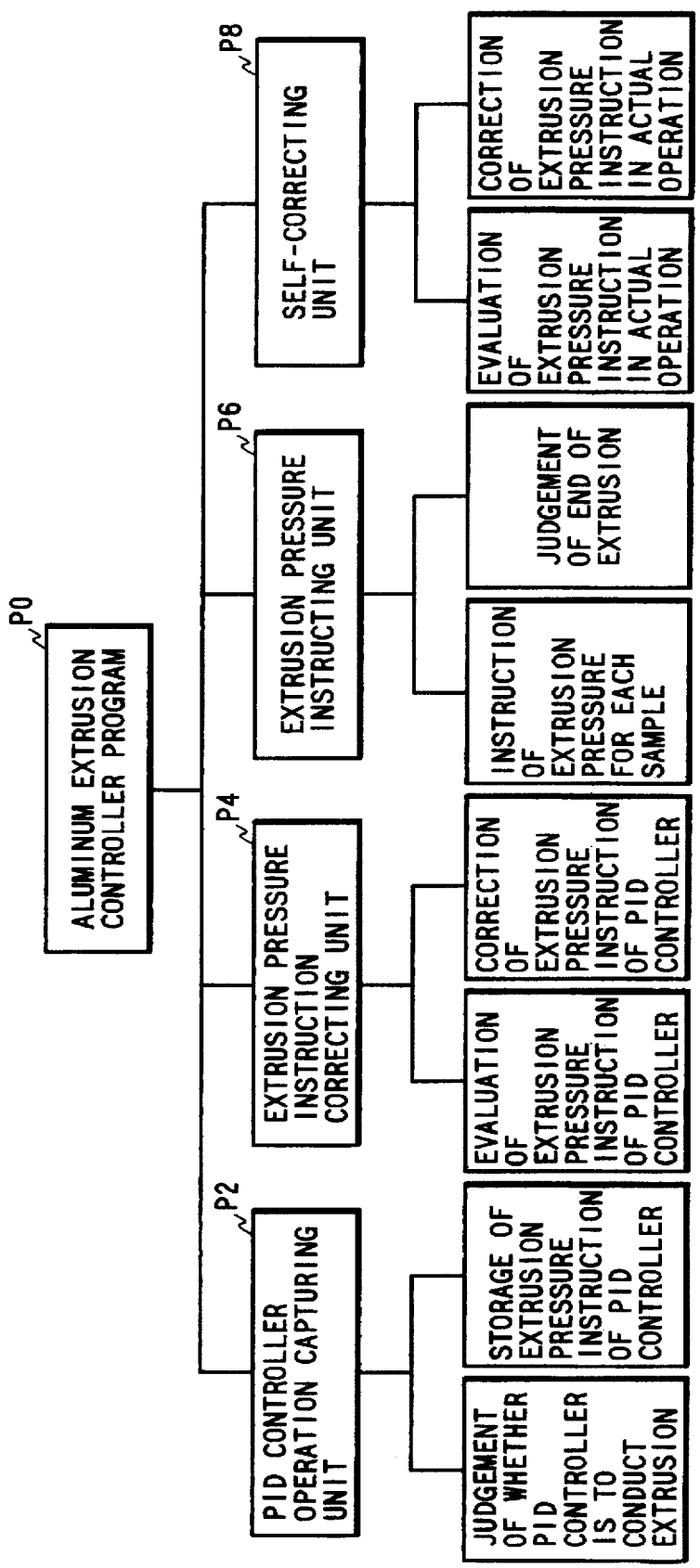
FIG. 3 is a block diagram showing the software configuration of the aluminum extrusion controller 20.

FIG. 3 shows the software configuration of the aluminum extrusion controller 20 of the embodiment. An aluminum extrusion controller program P0 comprises a PID controller operation capturing unit P2, an extrusion pressure instruction correcting unit P4, an extrusion pressure instructing unit P6, and a self-correcting unit P8.

The PID controller operation capturing unit P2 judges whether the PID controller 22 is to conduct extrusion, and stores extrusion pressure instructions of the PID controller 22. The extrusion pressure instruction correcting unit P4 evaluates the extrusion pressure instructions of the PID controller 22, and corrects the extrusion pressure instructions.

The extrusion pressure instructing unit P6 issues the extrusion pressure instructions for each sample, and judges the end of extrusion. The self-correcting unit P8 evaluates the extrusion pressure instructions in the actual operation, and corrects the extrusion pressure instructions.

Figure 4:
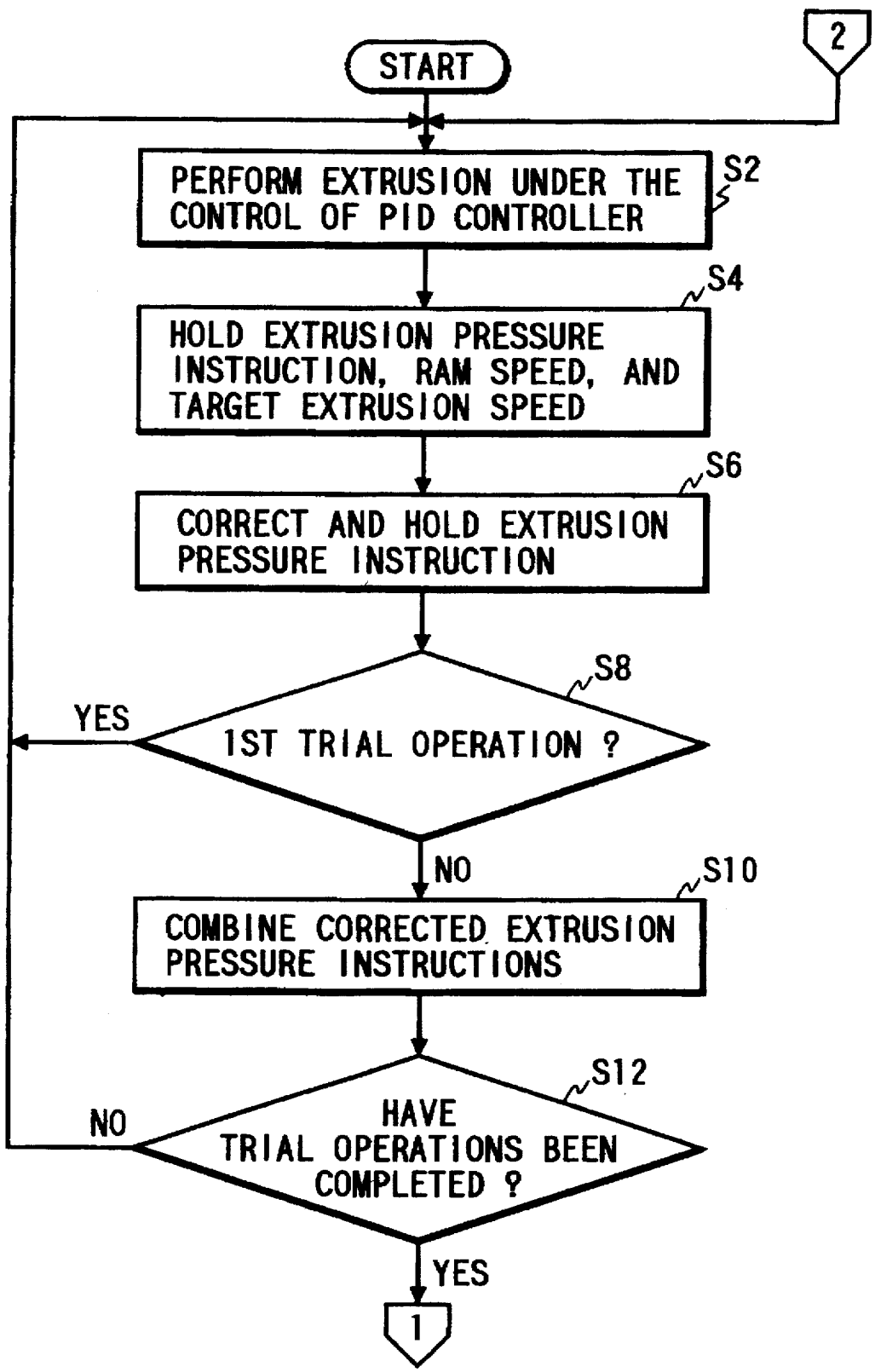
FIGS. 4 and 5 are a flowchart showing the operation of the aluminum extrusion controller 20.
Figure 5:
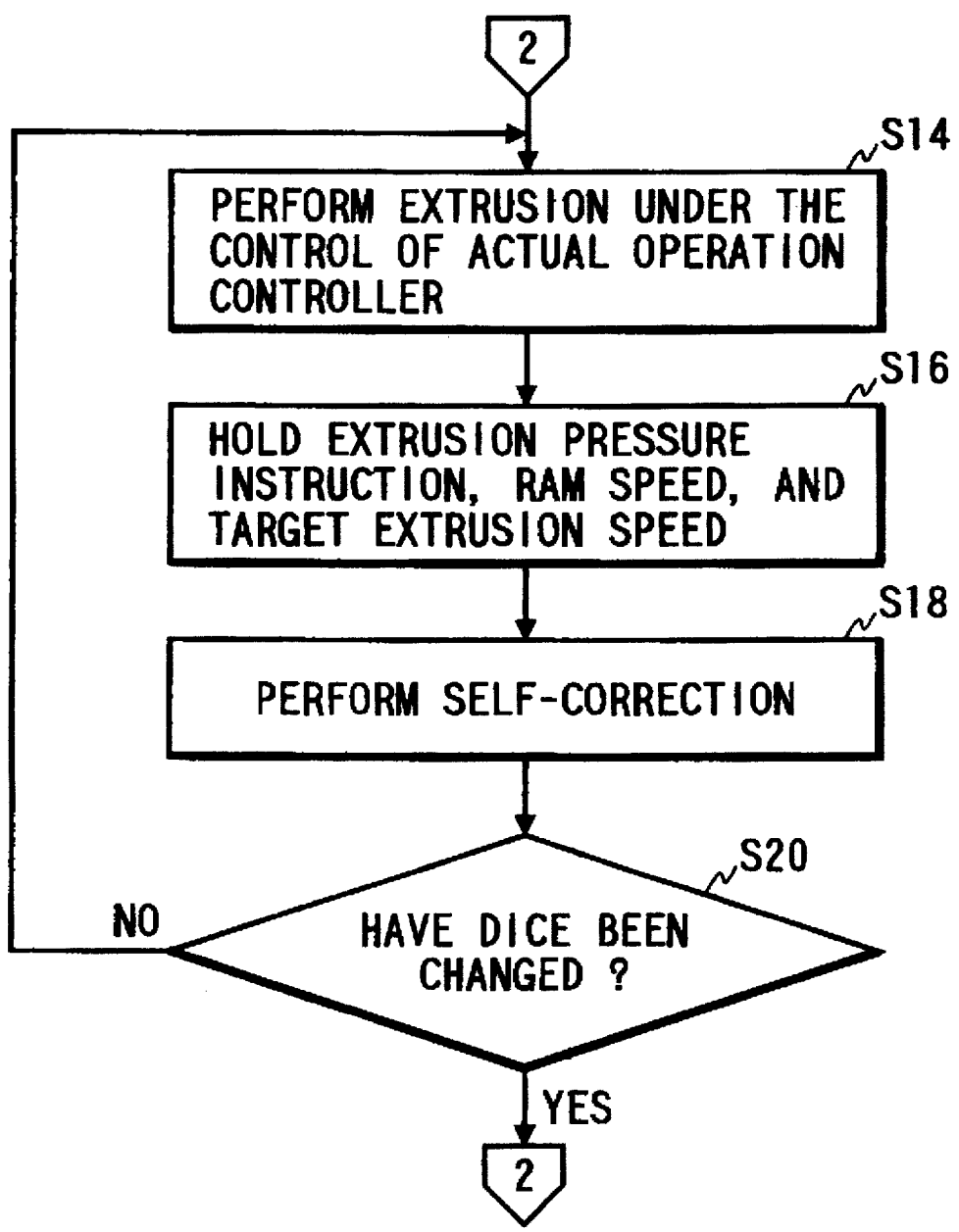
Figure 6:
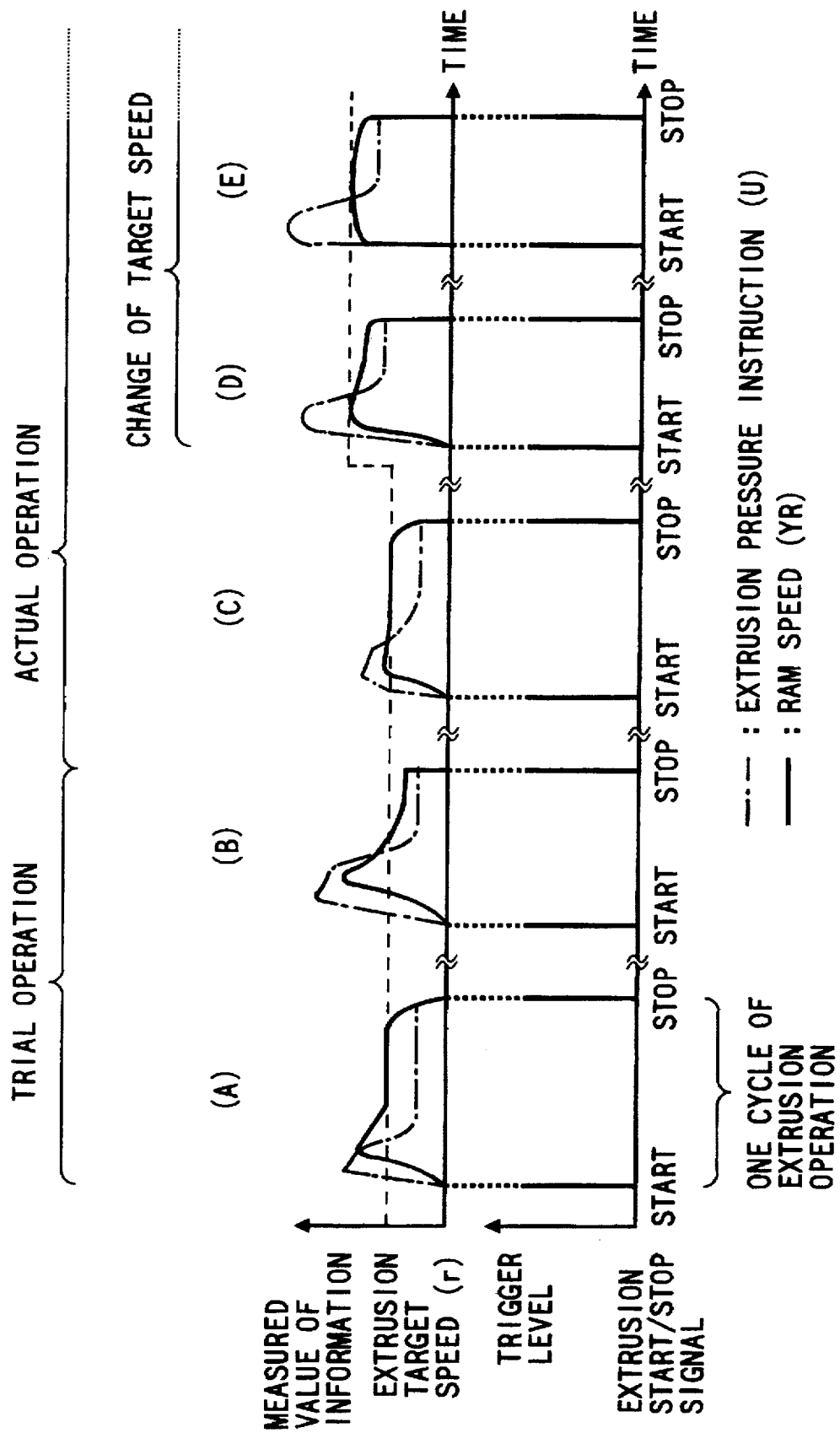
FIG. 6 shows measured values of information in trial and actual operations.

Next, the operation of the aluminum extrusion controller 20 will be described. FIGS. 4 and 5 are a flowchart showing the operation of the aluminum extrusion controller 20. FIG. 6 shows relationships in trial and actual operations between the target extrusion speed (r), the extrusion pressure instruction (U), the ram speed (YR), an extrusion start signal, and an extrusion stop signal. The extrusion start signal and the extrusion stop signal will be described later. According to FIG. 2, the operation of the aluminum extrusion controller 20 will be described with reference to FIGS. 4, 5, and 6.

The CPU 64 actuates the operation changeover switch SW1 through the digital output port 76 so that the switch is set to the state shown in FIG. 2 (trial operation position). The operation changeover switch SW1 has three interlocked contacts SW1a, SW1b, and SW1c, and is configured so that, in the trial operation position, the contact SW1a is opened and the contacts SW1b and SW1c are closed.

Therefore, when the operation changeover switch SW1 is set to the trial operation position, a feedback loop is formed between the PID controller 22 and the aluminum extruder 60. That is, when the aluminum extruder 60 is caused to operate under this state, the extrusion process (trial operation) is conducted under the control of the PID controller 22 (see step S2 of FIG. 4).

Next, the CPU 64 detects the extrusion start signal issued from the aluminum extruder 60, through the digital input port 70, and starts to capture the given target extrusion speed (r), the extrusion pressure instruction (U) output from the PID controller 22, and the ram speed (YR) output from the aluminum extruder 60.

When the extrusion stop signal is thereafter detected, the process of capturing these data is completed. In this way, data of the 1-cycle extrusion operation are captured (see part (A) of FIG. 6). These data are captured through the A/D converter 72, and then stored in the memory 66 (see step S4 of FIG. 4).

Figure 7:
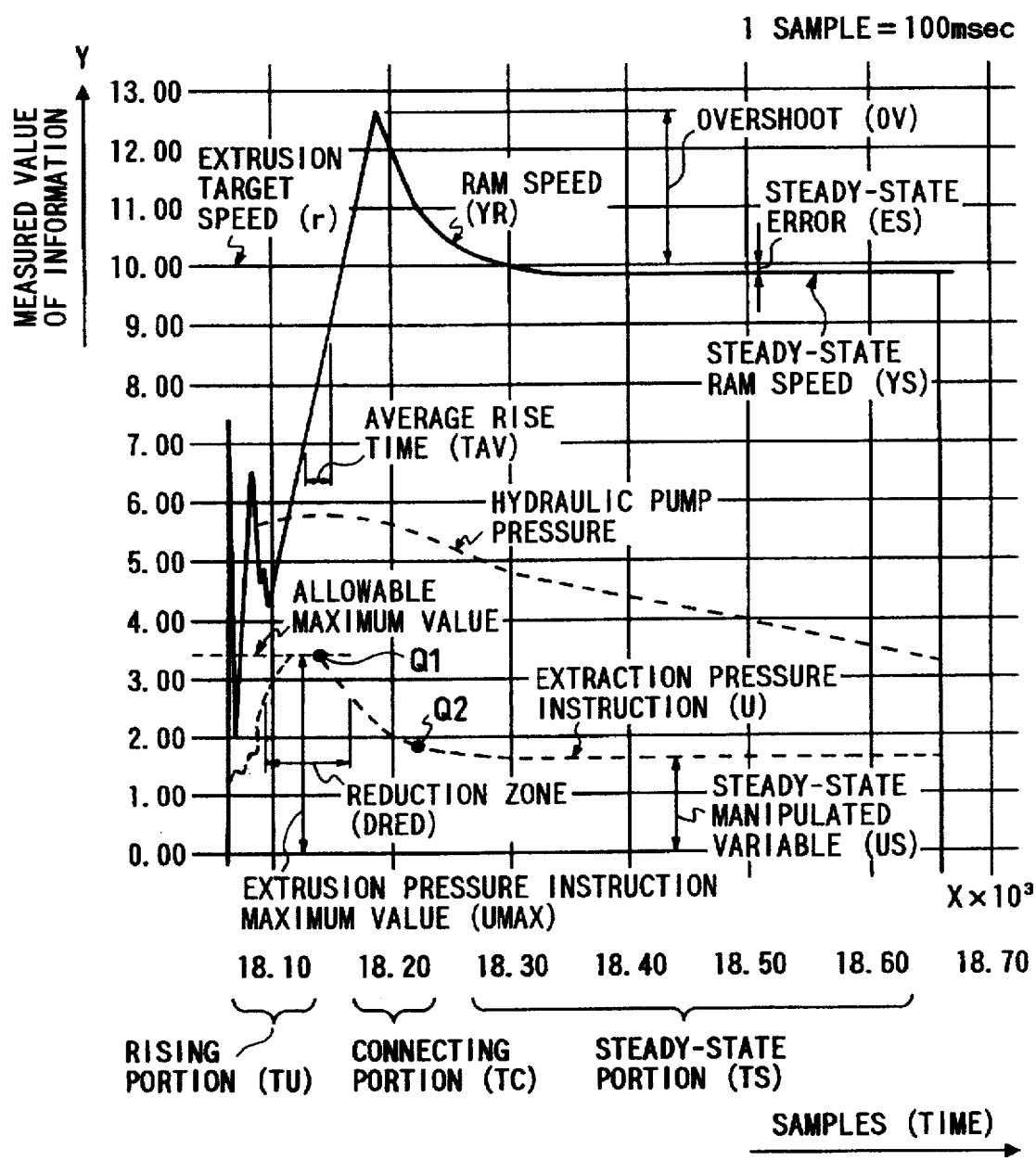
FIG. 7 shows measured values of information in a 1-cycle extrusion operation.
Figure 8:
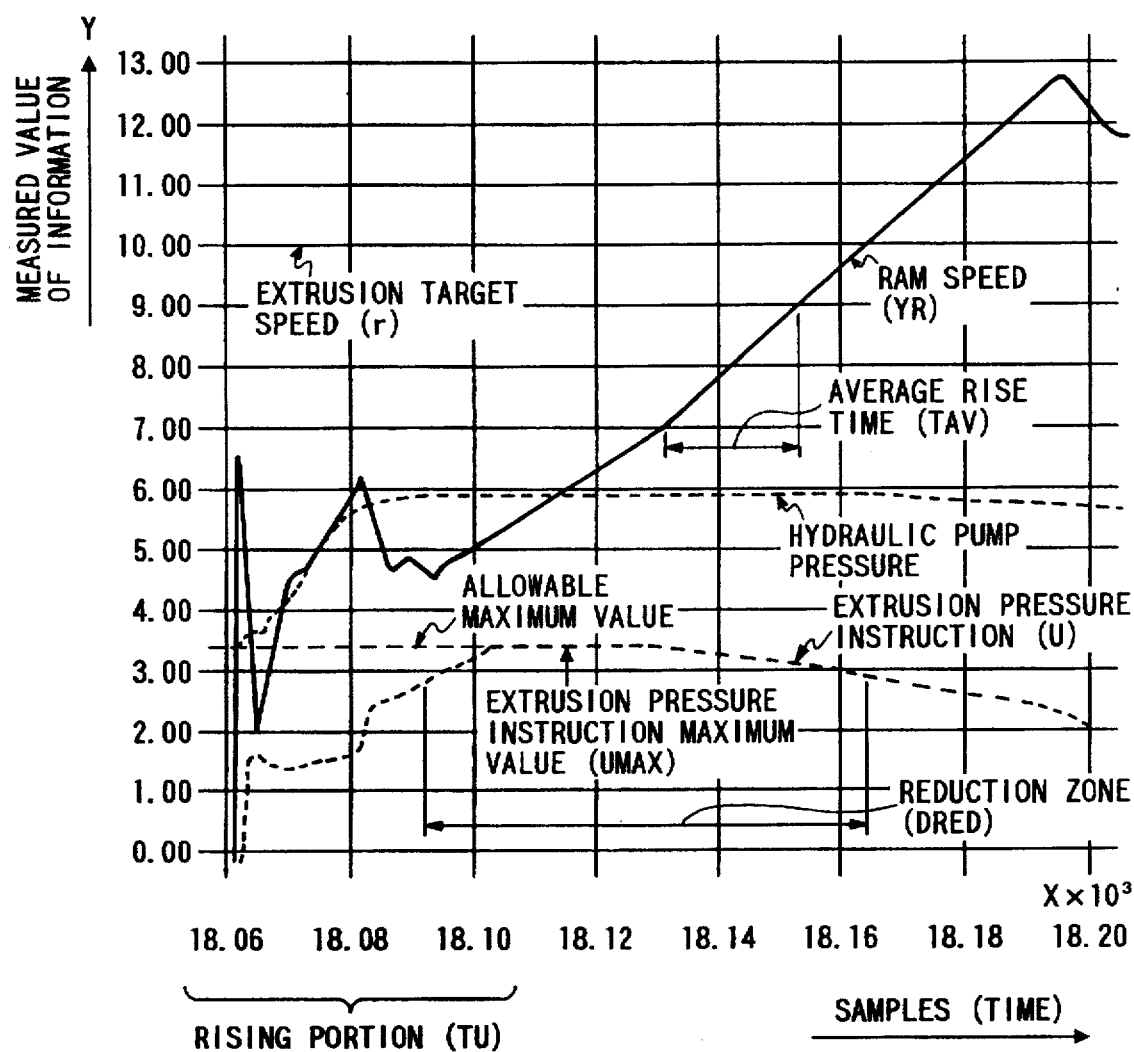
FIG. 8 shows a rising portion in an enlarged manner.

FIG. 7 shows a time-series pattern of each data captured in a 1-cycle extrusion operation, and FIG. 8 shows, in an enlarged manner, a rising portion (TU) of FIG. 7. In the description, a rising portion (TU) means a range elongating from the beginning of an extrusion operation to an instant when the extrusion pressure instruction (U) is maximum for the first time.

Next, the CPU 64 corrects the extrusion pressure instruction (U) on the basis of data relating to the trial operation which are captured in the 1-cycle extrusion operation (see step S6 of FIG. 4). The correction of the extrusion pressure instruction (U) is conducted in each of a rising portion (TU), a steady-state portion (TS), and a connecting portion (TC) which are shown in FIG. 7.

First, the correction of the rising portion (TU) of the extrusion pressure instruction (U) will be described. The rising portion (TU) is corrected in different manners depending on the overshoot amount, i.e., the cases where there is no overshoot (the overshoot amount (OV) of the ram speed (YR) shown in FIG. 7 is less than 2% of the target extrusion speed (r)), and where there is overshoot (the overshoot amount (OV) is not less than 2% of the target extrusion speed (r)).

When there exists an overshoot, the process is conducted in further finely divided manners, depending on the cases where the limitation of the manipulated variable is not to be applied to the extrusion pressure instruction (U), and where the limitation of the manipulated variable is to be applied to the extrusion pressure instruction (U). The limitation of the manipulated variable means a process wherein the maximum allowable value of the extrusion pressure instruction (U) is set, and, when the extrusion pressure instruction (U) is disposed to exceed the maximum allowable value, it is forcedly limited to the maximum allowable value.

The process conducted when there is no overshoot (see FIG. 9) will be described. In this case, a smoothing process is first done, and then an advancing process in which the time of outputting the extrusion pressure instruction (U) is advanced is conducted.

The smoothing process is a process wherein the vicinity of the rising portion (TU) affected by an unstable behavior of the aluminum extruder 60 is smoothed, thereby achieving an object that such an unstable factor is eliminated from the extrusion pressure instruction (U) so that the aluminum extrusion operation is smoothly conducted. The smoothing process is conducted in accordance with the following equation:

$$UA(k) = \begin{cases} UZ(k) & \left(1 \leq k < \frac{n}{2}\right) \\ \sum_{j=0}^{n-1} UZ\left(k-j+\frac{n}{2}\right)/n & \left(\frac{n}{2} \leq k \leq n\right) \end{cases} \quad (1)$$

where UZ is the extrusion pressure instruction before the smoothing process, UA is the extrusion pressure instruction after the smoothing process, n is the number of samples used in the smoothing process, and k is the sampling time.

Figure 9:
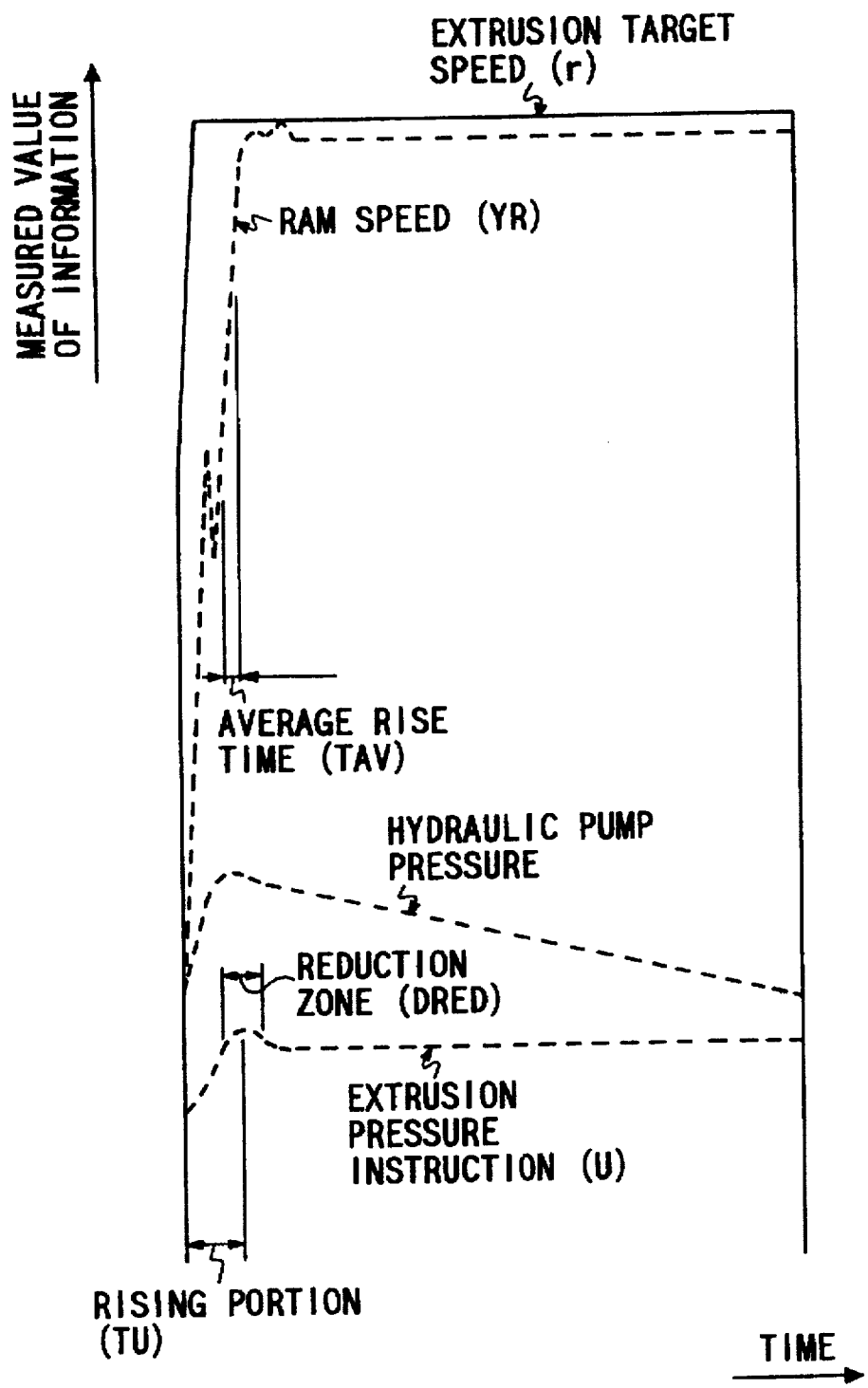
FIG. 9 shows measured values of information when no overshoot exists.

In this embodiment, the smoothing process is conducted in a period from the extrusion start of the extrusion pressure instruction (U) shown in FIG. 9 to the end of a reduction zone (DRED). The reduction zone (DRED) is a zone where the extrusion pressure instruction (U) is not less than 80% of the maximum value of the extrusion pressure instruction (U).

The advancing process is a process wherein, in accordance with the average rising rate of the ram speed (YR) shown in FIG. 9, the time of outputting the extrusion pressure instruction (U) is advanced. The rising portion (TU) and reduction zone (DRED) of the extrusion pressure instruction (U) which are shown in FIG. 9 are subjected to the advancing process. When the advancing amount is indicated by tb, the extrusion pressure instruction (U) is corrected according to the following equation:

{extrusion pressure instruction $U(t)$ after correction}={extrusion pressure instruction $U(t+tb)$ before correction}. (2)

When the average rising rate of the ram speed (YR) is small, or when the average rise time (TAV) is long, the advancing amount of the time of outputting the extrusion pressure instruction (U) is increased. This allows the average rising rate of the ram speed (YR) to be corrected so as to be increased. Therefore, when the advancing process is conducted, the cycle time of the aluminum extrusion can be shortened.

In order to obtain the advancing amount of the outputting time on the basis of the average rise time (TAV), fuzzy inference is used. The control rule of the fuzzy inference is as follows:

IF {average rise time (TAV) is short} THEN (advancing amount is small)

IF {average rise time (TAV) is long} THEN (advancing amount is large). (R1)

Figure 10A:
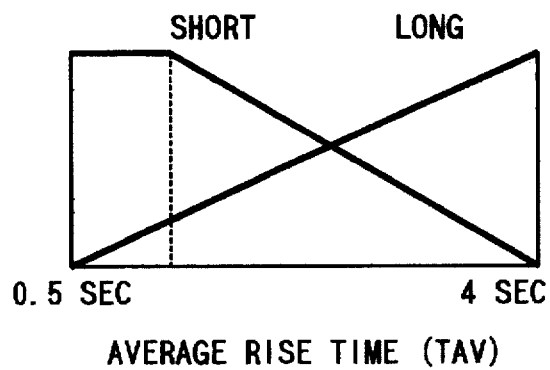
FIGS. 10A and 10B show membership functions of an advancing process.
Figure 10B:
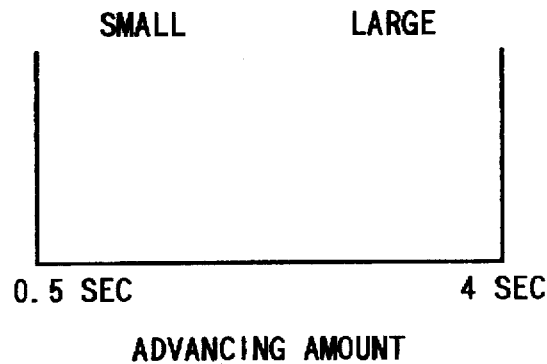

The membership functions of the fuzzy inference are shown in FIGS. 10A and 10B. In the embodiment, the support set of the average rise time (TAV) is set to be 0.5 to 4.0 sec., and that of the advancing amount to be 0.5 to 4.0 sec.

When the advancing process is conducted as described above, the time-series pattern of the extrusion pressure instruction (U) which is the trial manipulated pattern is corrected on the basis of the average rising rate of the ram speed (YR) shown in FIG. 9.

Next, the process conducted in the case where there is overshoot and the limitation of the manipulated variable is to be applied to the extrusion pressure instruction (U) (see FIG. 11) will be described. In this case, an extrusion pressure instruction maximum value correcting process wherein an extrusion pressure instruction maximum value (UMAX) which is the maximum value of the extrusion pressure instruction (U) is corrected is first conducted, and then a smoothing process and an advancing process are conducted.

The smoothing process and the advancing process are conducted in the same manner as the processes in the above-described case where there is no overshoot, or in accordance with Eq. (1) and rule R1. Similar to the above-described case, the range where the smoothing process is to be conducted elongates from the extrusion start of the extrusion pressure instruction (U) shown in FIG. 11 to the end of the reduction zone (DRED).

Figure 11:
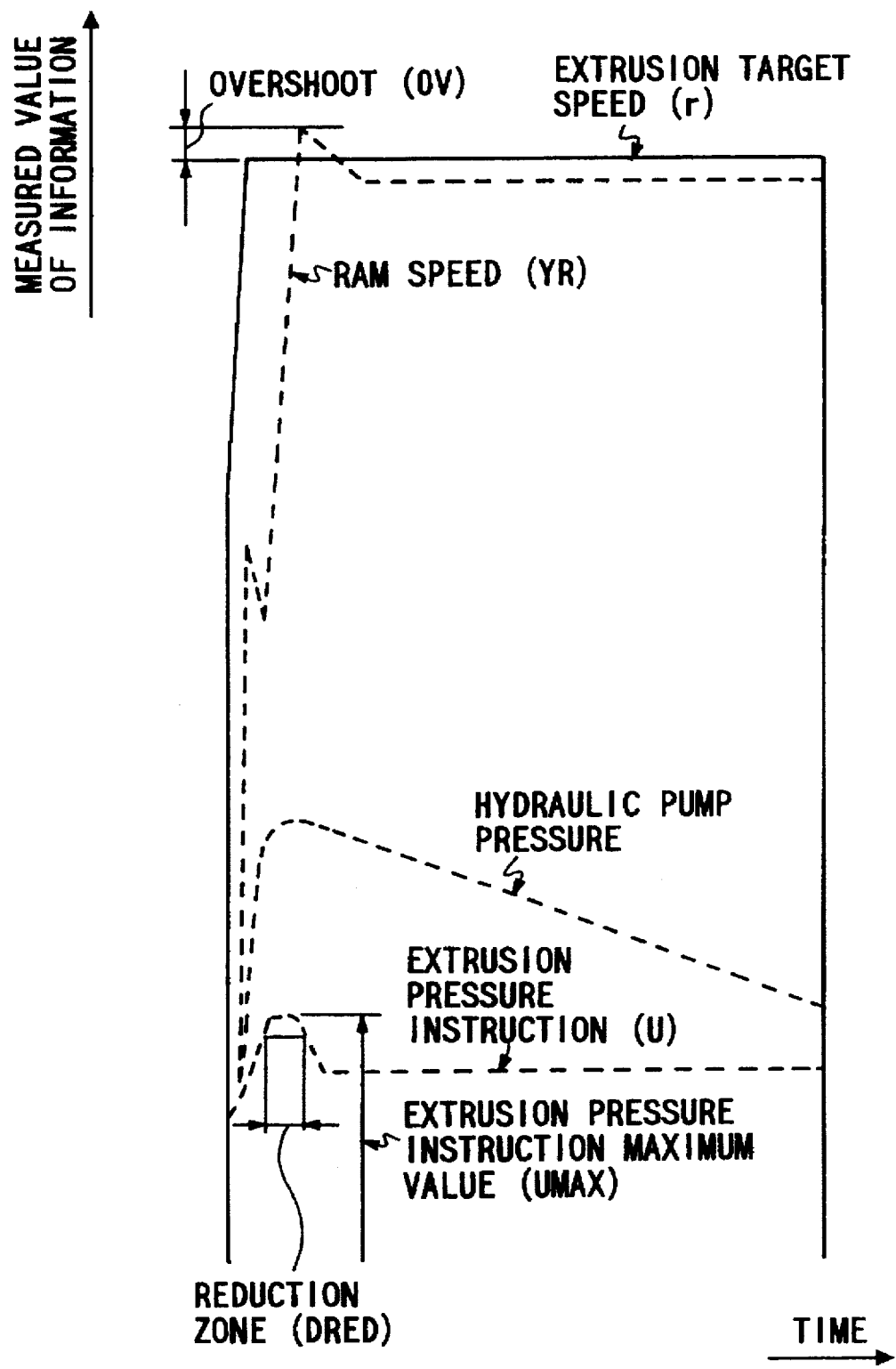
FIG. 11 shows measured values of information when an overshoot exists and manipulated variable limitation is not effected.

The extrusion pressure instruction maximum value correcting process is a process wherein an extrusion pressure instruction maximum value (UMAX) which is the maximum value of the extrusion pressure instruction (U) is corrected by reducing the extrusion pressure instruction (U) in accordance with the overshoot amount (OV) of the ram speed (YR) shown in FIG. 11. The reduction zone (DRED) shown in FIG. 11 is subjected to the extrusion pressure instruction maximum value correcting process.

The extrusion pressure instruction maximum value (UMAX) is proportional to the extrusion pressure instruction (U). Consequently, by correcting the extrusion pressure instruction (U) according to the following equation:

{extrusion pressure instruction after correction}={extrusion pressure instruction before correction}{1−(reduction ratio)}, (3)

the extrusion pressure instruction maximum value (UMAX) can be corrected according to the following equation:

(extrusion pressure instruction maximum value after correction)= (extrusion pressure instruction maximum value before correction){1−(reduction ratio)} (4)

When the overshoot amount (OV) of the ram speed (YR) is large, the reduction ratio is set to be large. This allows the extrusion pressure instruction maximum value (UMAX) to be reduced so that the overshoot amount (OV) is suppressed.

In order to obtain the reduction ratio on the basis of the overshoot amount (OV), fuzzy inference is used. The control rule of the fuzzy inference is as follows:

IF {overshoot amount (OV) is large} THEN (reduction ratio is large)

IF {overshoot amount (OV) is small} THEN (reduction ratio is small) (R2)

Figure 12A:
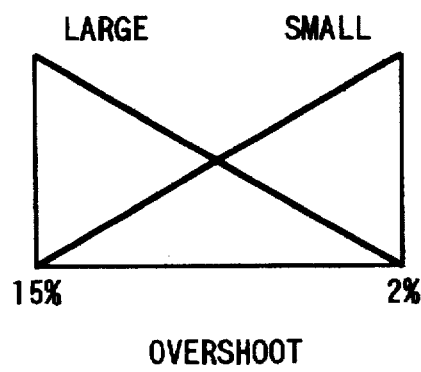
FIGS. 12A and 12B show membership functions of a process for correcting an extrusion pressure instruction maximum value.
Figure 12B:
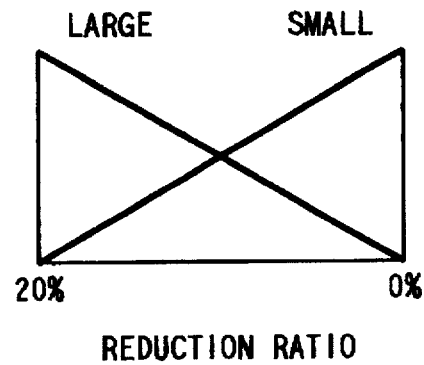

The membership functions of the fuzzy inference are shown in FIGS. 12A and 12B. In the embodiment, the support set of the overshoot amount (OV) is set to be 2 to 15%, and that of the reduction ratio is set to be 0 to 20%.

When the extrusion pressure instruction maximum value correcting process is conducted as described above, the extrusion pressure instruction maximum value (UMAX) in the time-series of the extrusion pressure instruction (U) which is the trial manipulated pattern is corrected on the basis of the overshoot amount (OV) of the ram speed (YR) shown in FIG. 11.

Next, the process conducted in the case where there is overshoot and the limitation of the manipulated variable is to be applied to the extrusion pressure instruction (U) (see FIG. 7) will be described. In this case, a manipulated variable limitation time shortening process which corrects a manipulated variable limitation time (TLMT) that is applied to the limitation of the manipulated variable is first conducted. Thereafter, the same processes as those conducted in the above-described case where there is no overshoot and the limitation of the manipulated variable is not to be applied to the extrusion pressure instruction (U), i.e., the extrusion pressure instruction maximum value correcting process, the smoothing process, and the advancing process are conducted.

Figure 13:
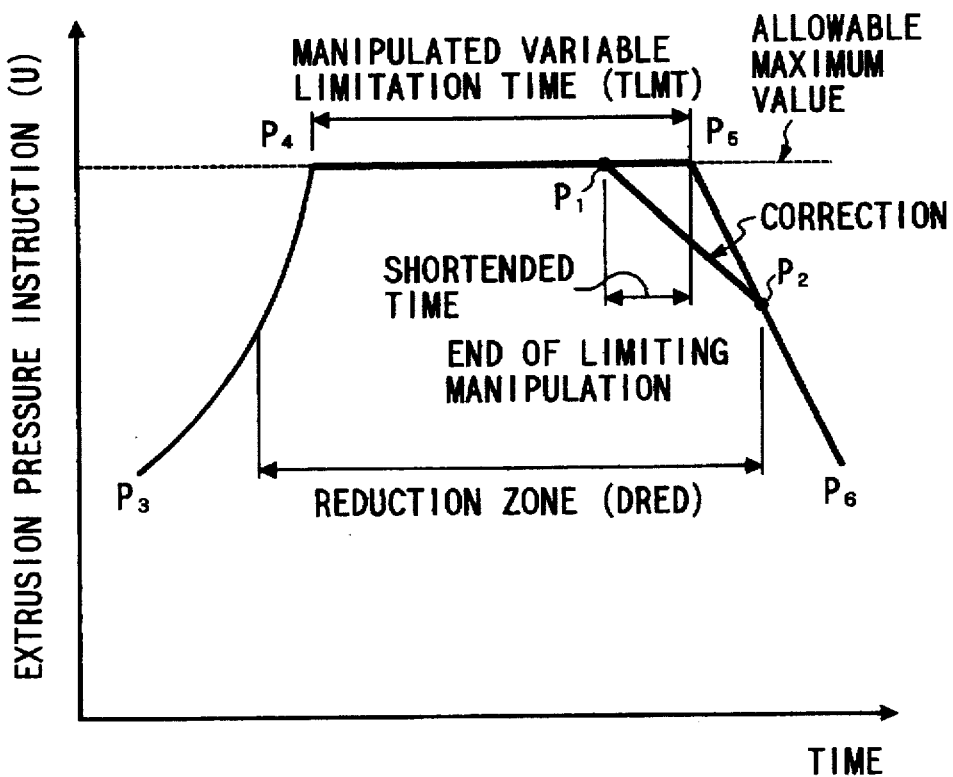
FIG. 13 shows, in an enlarged manner, a portion to which the manipulated variable limitation is to be applied.

FIG. 13 shows, in an enlarged manner, a portion to which the limitation of the manipulated variable of the extrusion pressure instruction (U) is to be applied. The manipulated variable limitation time shortening process is a process wherein the manipulated variable limitation time (TLMT) of the extrusion pressure instruction (U) shown in FIG. 13 is reduced in accordance with the overshoot amount (OV) of the ram speed (YR) shown in FIG. 7, thereby correcting the pattern of the extrusion pressure instruction (U). First, a process of shortening the manipulated variable limitation time (TLMT) is conducted.

(manipulated variable limitation time after correction)=(manipulated variable limitation time before correction){1−(time reduction ratio)} (5)

When the overshoot amount (OV) of the ram speed (YR) is large, the time reduction ratio is set to be large. This allows the manipulated variable limitation time (TLMT) to be corrected so as to be shortened.

In order to obtain the time reduction ratio on the basis of the overshoot amount (OV), fuzzy inference is used. The control rule of the fuzzy inference is as follows:

IF {overshoot amount (OV) is large} THEN (time reduction ratio is large)

IF {overshoot amount (OV) is small} THEN (time reduction ratio is small) (R3)

Figure 14A:
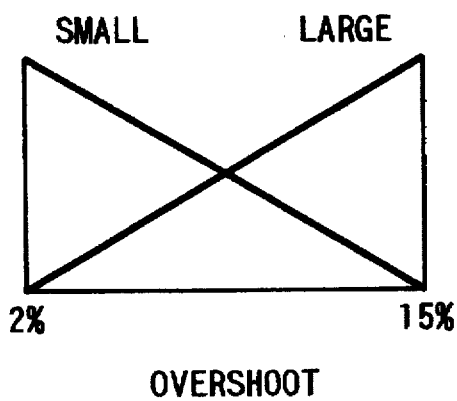
FIGS. 14A and 14B shows membership functions of a process for shortening a manipulated variable limitation time.
Figure 14B:
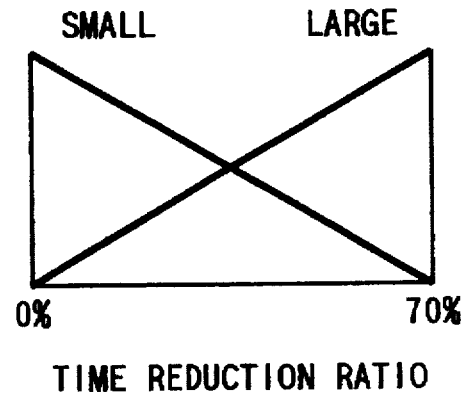

The membership functions of the fuzzy inference are shown in FIGS. 14A and 14B. In the embodiment, the support set of the overshoot amount (OV) is set to be 2 to 15%, and that of the reduction ratio is set to be 0 to 70%.

When the manipulated variable limitation time shortening process is conducted as described above, the manipulated variable limitation time (TLMT) (FIG. 13) in the time-series of the extrusion pressure instruction (U) which is the trial manipulated pattern is corrected on the basis of the overshoot amount (OV) of the ram speed (YR) shown in FIG. 11.

Then, the end point P1 of the manipulated variable limitation time after correction is connected with the end point P2 of the reduction zone (DRED) by a line on the patterns P3, P4, P5, and P6 of FIG. 13 indicating the extrusion pressure instruction (U) before correction. The patterns P3, P4, P1, P2, and P6 are set as a new pattern of the extrusion pressure instruction (U), and then the manipulated variable limitation time shortening process is completed.

Next, the correction of the steady-state portion (TS) of the extrusion pressure instruction (U) shown in FIG. 7 will be described. A steady-state portion correcting process wherein the steady-state portion (TS) is corrected is a process wherein a steady-state manipulated variable (US) of the extrusion pressure instruction (U) is corrected in accordance with the overshoot amount (OV) of the ram speed (YR) shown in FIG. 7. The steady-state portion correcting process is conducted in accordance with the following expression:

$$USS = US(1 - ES/r)$$ (6)

where US is the steady-state manipulated variable before the steady-state portion correcting process, YS is the steady-state ram speed, r is the target extrusion speed, ES is the steady-state error, and USS is the steady-state manipulated variable after the steady-state portion correcting process.

As described above, the steady-state error (ES) in Eq. (6) is a difference between the steady-state ram speed (YS) that is an average ram speed in a period from an elapse of 50% of one cycle of the extrusion operation to that of 80%, and the target extrusion speed (r). Consequently, the steady-state portion correcting process can conduct also the smoothing process of the steady-state portion (TS) of the extrusion pressure instruction (U). The smoothing process of the steady-state portion (TS) can prevent the hunting phenomenon of the steady-state portion (TS) from occurring.

Next, a connecting portion correcting process wherein the connecting portion (TC) of the extrusion pressure instruction (U) shown in FIG. 7 is corrected will be described. The connecting portion correcting process is a process which is to be conducted when a gap is formed between the rising portion (TU) and the steady-state portion (TS) as a result of the above-described corrections for the rising portion (TU) and the steady-state portion (TS).

When such a gap exists, the end point Q1 of the rising portion (TU) in the pattern of the extrusion pressure instruction (U) is connected with the start point Q2 of the steady-state portion (TS) by a line, and a process of setting it as a new pattern of the connecting portion (TC) of the extrusion pressure instruction (U) is conducted.

On the basis of data relating to the trial operation, when the corrections for the rising portion (TU), steady-state portion (TS), and connecting portion (TC) (see FIG. 7) of the extrusion pressure instruction (U) are completed, the CPU 64 stores the correction result in the memory 66 (see step S6 of FIG. 4).

Next, the CPU 64 judges whether the above-described trial operation is conducted for the first time (see step S8 of FIG. 4). If the trial operation is the first one, the same operation is again conducted (see part (B) of FIG. 6 and steps S2 to S6 of FIG. 4).

If the trial operation is the second or later one, the correction result of the extrusion pressure instruction (U) which is stored in the memory 66 and obtained by the preceding operations is combined with the correction result of the extrusion pressure instruction (U) obtained by the current trial operation. The combined result is stored as a new correction result in the memory 66 (see step S10 of FIG. 4).

The CPU 64 then judges whether a preset number of trial operations have been conducted (see step S12 of FIG. 4). If the judgment result is negative, steps S2 to S12 are repeated. In the embodiment, the trial operation is set so as to be conducted 4 times.

If it is judged that the preset number of trial operations have been conducted, i.e., the trial operation has been completed, the CPU 64 actuates the operation changeover switch SW1 through the digital output port 76 shown in FIG. 2 so that the switch is set to the state (actual operation position) which is an inversion of that shown in FIG. 2. That is, in the actual operation position, the contact SW1a is closed and the contacts SW1b and SW1c are opened.

Therefore, when the operation changeover switch SW1 is set to the actual operation position, the PID controller 22 for the trial operation is disconnected from the aluminum extruder 60. Thereafter, the aluminum extrusion is conducted under the control of the actual operation controller 26 (see FIG. 1) (see part (C) of FIG. 6 and step S14 of FIG. 5).

Specifically, the CPU 64 outputs as the criterial manipulated pattern the correction result of the extrusion pressure instruction (U) which is stored in the memory 66 and obtained by the above-described trial operation, to the aluminum extruder 60 through the D/A converter 74 shown in FIG. 2. This causes the aluminum extrusion controller 20 to conduct the feedforward control on the aluminum extrusion (see FIG. 1).

In the same manner as in the case of the trial operation, the CPU 64 captures data of 1-cycle extrusion in the actual operation, such as the given target extrusion speed (r), the extrusion pressure instruction (U) output from the D/A converter 74, and the ram speed (YR) output from the aluminum extruder 60, through the A/D converter 72, and then stores these data in the memory 66 (see step S16 of FIG. 5).

The CPU 64 evaluates the captured data of the extrusion operation in the actual operation. If the steady-state error (ES) of the ram speed (YR) shown in FIG. 7 remains, the steady-state portion (TS) of the extrusion pressure instruction (U) which is the criterial manipulated pattern is self-corrected in accordance with Eq. (6) in the same manner as the above-described case of the trial operation (see step S18 of FIG. 5).

Also in the actual operation, an aluminum extrusion control with higher reliability can be realized by continuing the self-correction of the steady-state portion (TS) of the extrusion pressure instruction (U).

The CPU 64 monitors a die exchange signal issued from the aluminum extruder 60, through the digital input port 70. If the die exchange signal is not issued, the actual operation is repeatedly conducted (steps S14 to S20 of FIG. 5).

When the target extrusion speed (r) is changed during the actual operation, the CPU 64 proportionally increases or decreases the extrusion pressure instruction (U) in accordance with the change of the target extrusion speed (r) (see parts (D) and (E) of FIG. 6).

When the CPU 64 receives the die exchange signal, the CPU actuates the operation changeover switch SW1 through the digital output port 76 so that the switch is again set to the state (trial operation position) shown in FIG. 2, and resets the contents of the memory 66. Then the trial operation using the PID controller 22 starts to be conducted on the new die (see step S20 of FIG. 5). In this way, each time when the die is exchanged, the optimum criterial manipulated pattern for respective die is obtained as a result of the trial operation.

In some cases, in the trial and actual operations, the same die is used, but only the extrusion length, i.e., the length of an aluminum bar in the actual operation is different from that in the trial operation. In order to comply with such cases, the rising portion (TU) and steady-state portion (TS) of the extrusion pressure instruction (U) after correction are not changed, the outputting time of the steady-state manipulated variable (US) (see FIG. 7) of the steady-state portion (TS) is extended or shortened.

Figure 15:
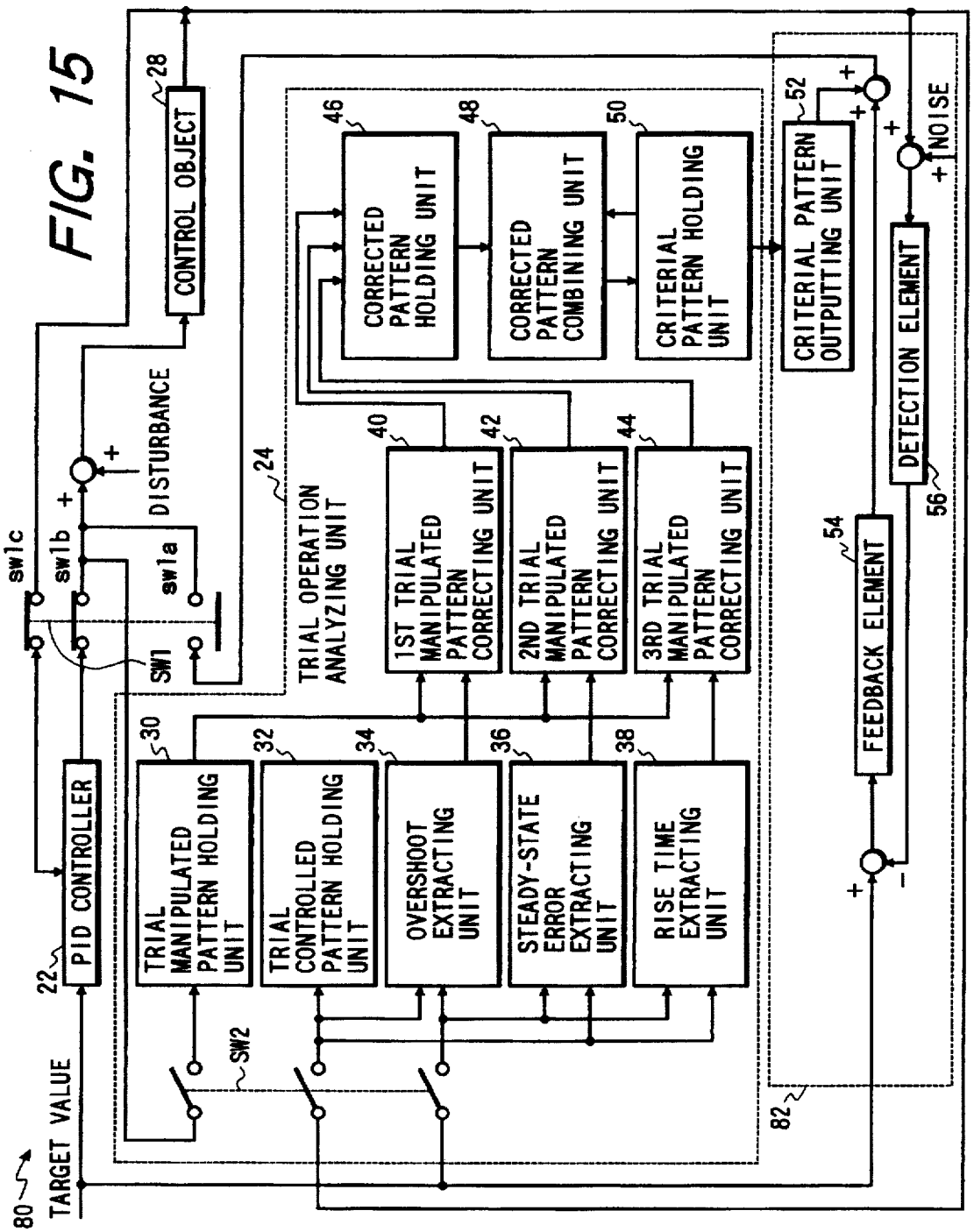
FIG. 15 is a block diagram showing the configuration of an aluminum extrusion controller 80 according to another embodiment of the invention.

FIG. 15 shows the configuration of an aluminum extrusion controller 80 which is a control apparatus according to another embodiment of the invention. With respect to the PID controller 22, the trial operation analyzing unit 24, and the operation changeover switch SW1, the aluminum extrusion controller 80 are the same as the aluminum extrusion controller 20 shown in FIG. 1. However, the contents of an actual operation controller 82 are different from those of the aluminum extrusion controller 20 shown in FIG. 1.

Specifically, unlike the actual operation controller 26 of the aluminum extrusion controller 20 shown in FIG. 1, the actual operation controller 82 of the aluminum extrusion controller 80 of the embodiment shown in FIG. 15 has a configuration in which the target value is not supplied to the criterial pattern outputting unit 52.

This configuration may be used in a case where the same target value is always set when the same die is used, or in a case where the extrusion pressure instruction (U) does not change in proportion to a change amount of the target value and hence the extrusion pressure instruction (U) needs to be set separately for each target value.

Figure 16:
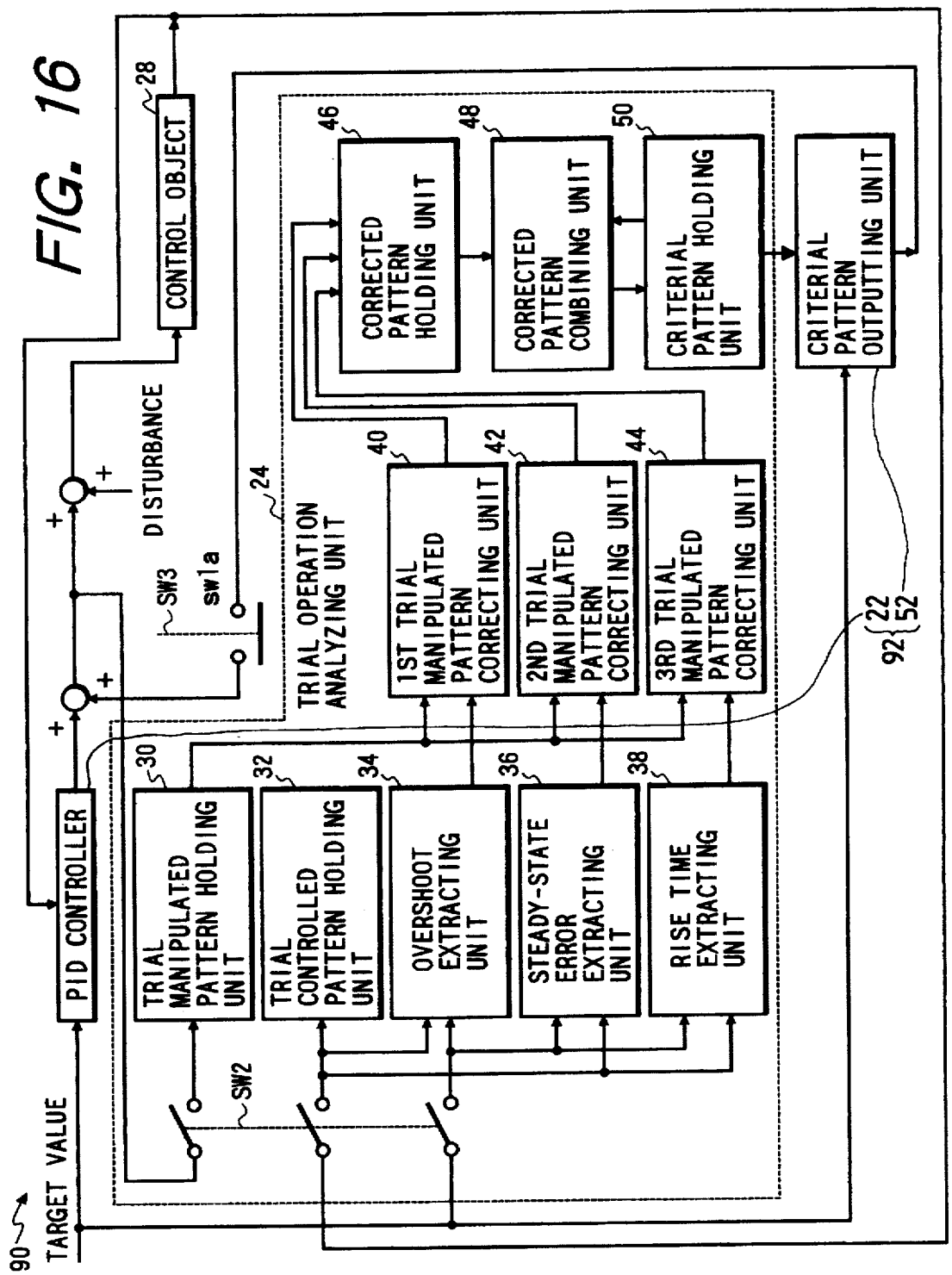
FIG. 16 is a block diagram showing the configuration of an aluminum extrusion controller 90 according to a further embodiment of the invention.

FIG. 16 shows the configuration of an aluminum extrusion controller 90 which is a control apparatus according to a further embodiment of the invention. With respect to the PID controller 22 and the trial operation analyzing unit 24, the aluminum extrusion controller 90 are the same as the aluminum extrusion controller 20 shown in FIG. 1. However, the contents of an actual operation controller 92 and an operation changeover switch SW3 are different from those of the aluminum extrusion controller 20 shown in FIG. 1.

Specifically, the actual operation controller 92 of the aluminum extrusion controller 90 shown in FIG. 16 is different in that the PID controller 22 which originally is the trial operation feedback circuit functions also as the actual operation feedback circuit, from the actual operation controller 26 of the aluminum extrusion controller 20 shown in FIG. 1 and having the feedback element 54 and the detection element 56 which are independent from the PID controller 22 which is the trial operation feedback circuit.

Unlike the aluminum extrusion controller 20 shown in FIG. 1, the operation changeover switch SW3 of the aluminum extrusion controller 90 shown in FIG. 16 is not provided with the contacts SW1b and SW1c which are used for changing over the feedback loop.

In the case where the PID controller 22, feedback element 54, and detection element 56 in the aluminum extrusion controller 20 shown in FIG. 1 have similar control characteristics, the aluminum extrusion controller 90 shown in FIG. 16 may be used in place of the aluminum extrusion controller 20 shown in FIG. 1.

When a single feedback circuit is used for the trial operation and the actual operation as described above, it is possible to simplify the circuit configuration. Therefore, the production cost of the aluminum extrusion controller 90 can be reduced.

Figure 17:
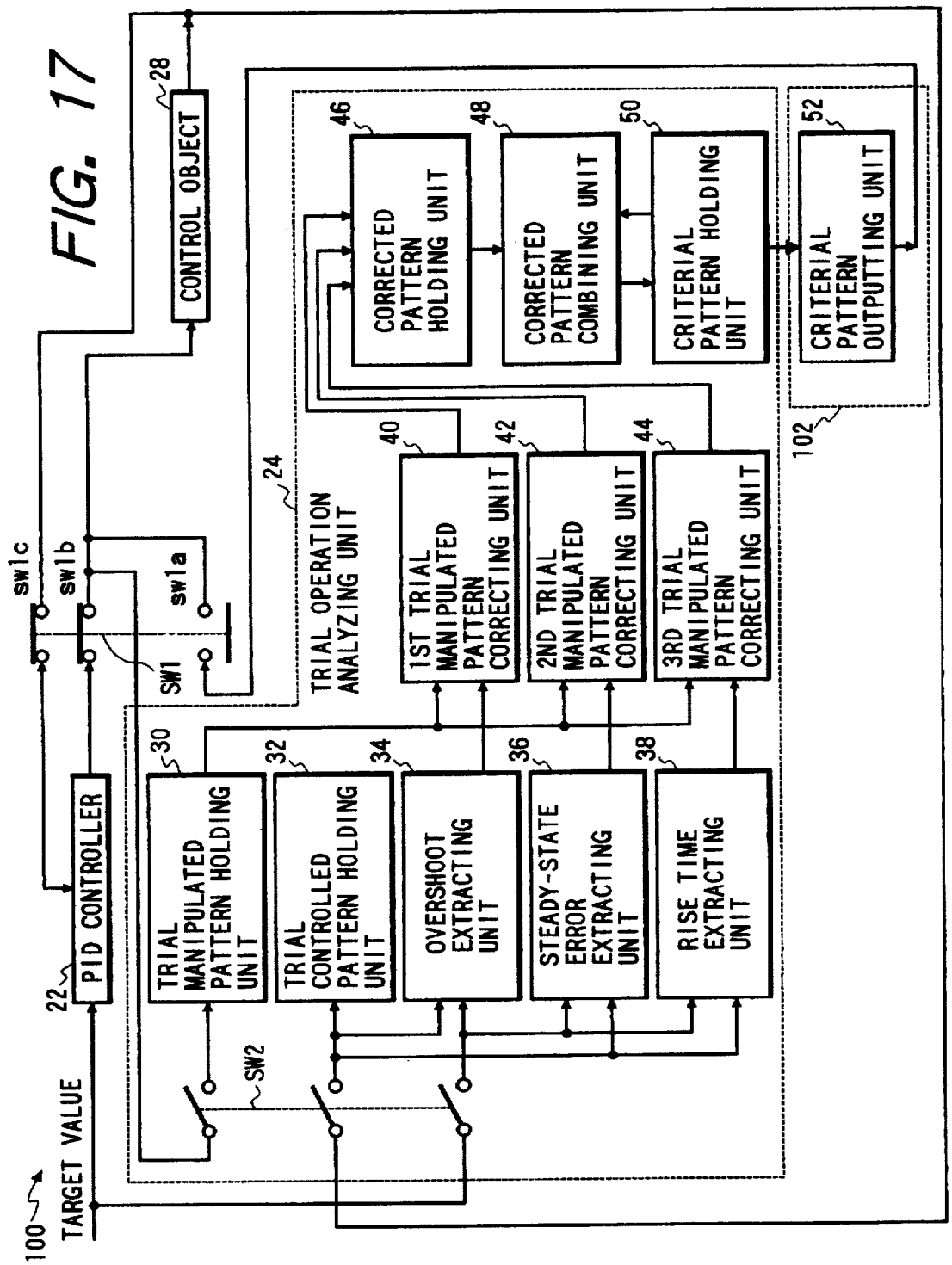
FIG. 17 is a block diagram showing the configuration of an aluminum extrusion controller 100 according to a still another embodiment of the invention.
Figure 18:
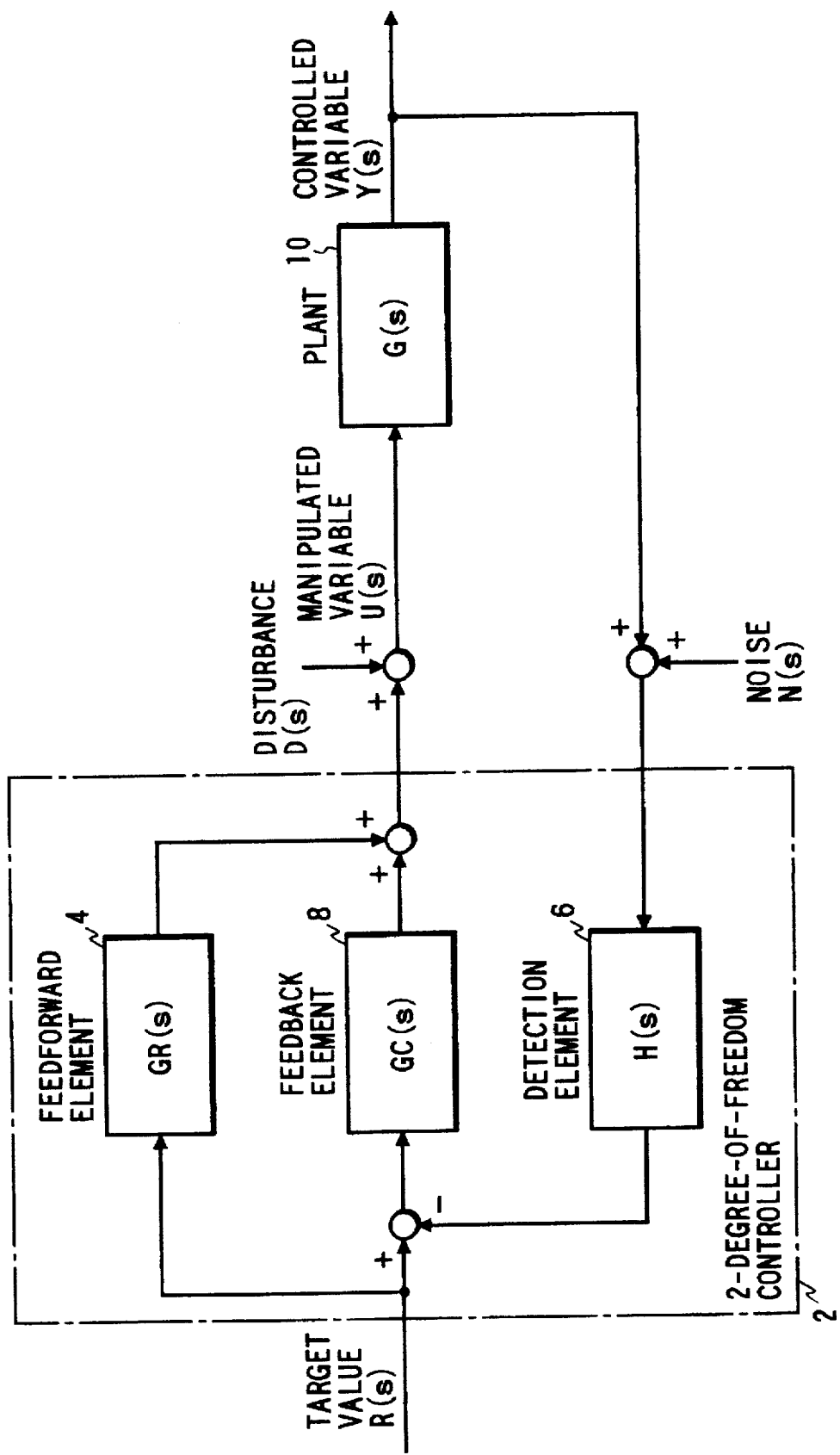
FIG. 18 is a block diagram showing the configuration of a conventional two-degree-of-freedom controller.
Figure 19:
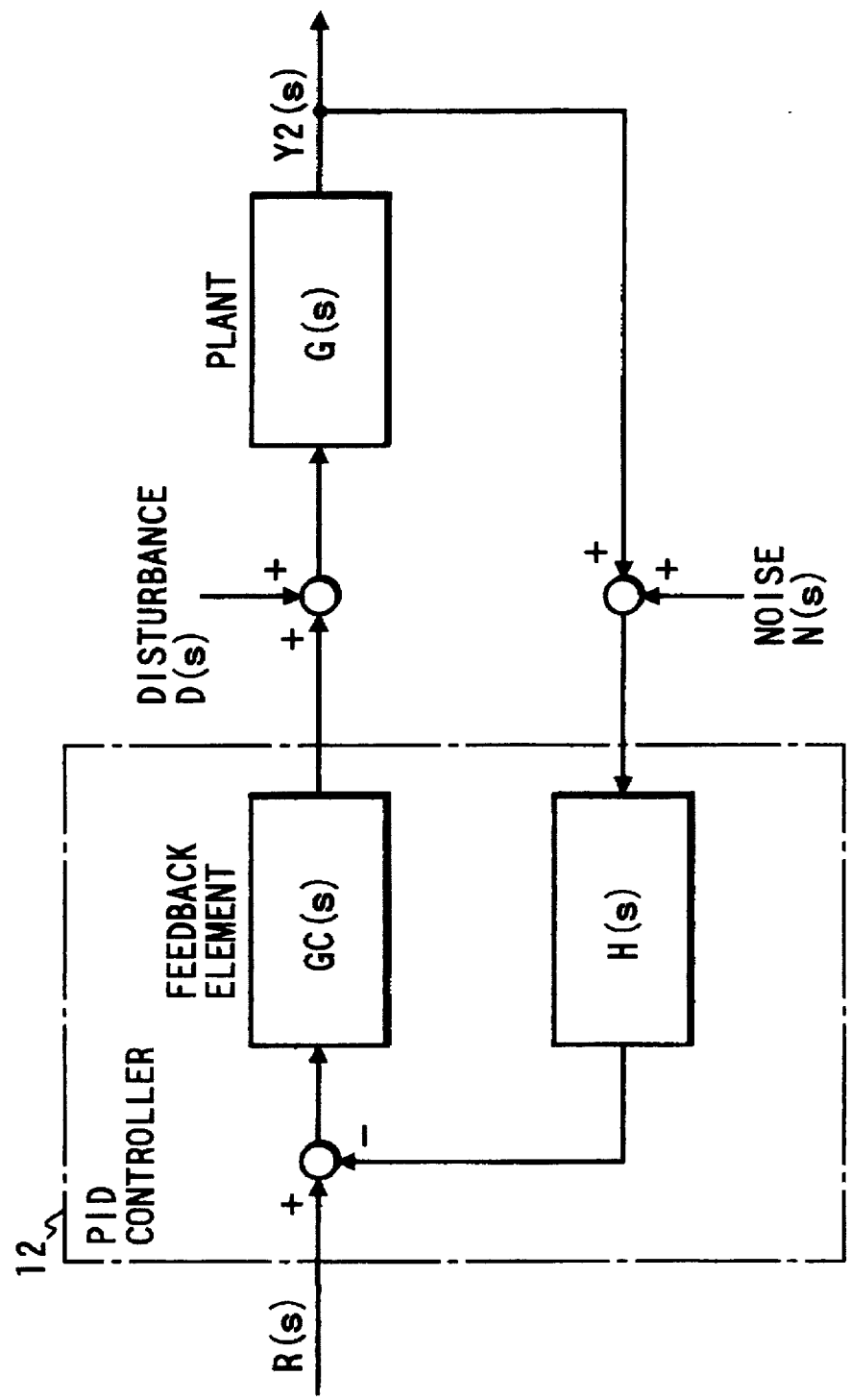
FIG. 19 is a block diagram showing the configuration of a PID controller.

FIG. 17 shows the configuration of an aluminum extrusion controller 100 which is a control apparatus according to a still further embodiment of the invention. With respect to the PID controller 22, the trial operation analyzing unit 24, and the operation changeover switch SW1, the aluminum extrusion controller 100 are the same as the aluminum extrusion controller 20 shown in FIG. 1. However, the contents of an actual operation controller 102 are different from those of the aluminum extrusion controller 20 shown in FIG. 1.

Specifically, the actual operation controller 102 of the aluminum extrusion controller 100 shown in FIG. 17 is different in that the controller consists of only the criterial pattern outputting unit 52 and is not provided with an actual operation feedback circuit, from the actual operation controller 26 of the aluminum extrusion controller 20 shown in FIG. 1 which has the actual operation feedback circuit.

In the case where, in the aluminum extrusion controller 20 shown in FIG. 1, there is no disturbance on the control object 28 or no noise on the detection element 56, the aluminum extrusion controller 100 shown in FIG. 17 may be used in place of the aluminum extrusion controller 20 shown in FIG. 1.

As described above, the omission of the feedback circuit which is to be used in the actual operation allows the circuit configuration to be simplified. Therefore, the production cost of the aluminum extrusion controller 100 can be reduced.

In the embodiments described above, the trial operation is conducted by the PID controller 22 shown in FIGS. 1, 15, 16, and 17. Alternatively, the trial operation may be conducted manually by a person such as a skilled operator of the aluminum extruder 60. When the trial operation is conducted by the PID controller 22, however, even a person who is not skilled in operation of the aluminum extruder 60 can conduct the trial operation, and hence it is convenient.

In the calculation of the trial correcting value such as the advancing amount of the outputting time on the basis of the trial evaluation characteristic value such as the average rise time (TAV), fuzzy inference is used. The invention is not restricted to this, and may use a conventional statistical inference technique or the like.

In the above, the embodiments in which the target extrusion speed (r) is constant over one cycle of the extrusion operation have been described. The invention may be applied to the case where the target extrusion speed (r) is changed in a fixed pattern over one cycle of the extrusion operation.

In the embodiments, the overshoot amount (OV), the average rise time (TAV), the steady-state error (ES), etc. are used as the trial evaluation characteristic value. Alternatively, another characteristic value may be used as the trial evaluation characteristic value.

As the trial correcting value, the advancing amount, the extrusion pressure instruction maximum value (UMAX), the manipulated variable limitation time (TLMT), the steady-state manipulated variable (US), etc. are used. Alternatively, another characteristic value may be used as the trial correcting value.

In the embodiments, when the time-series pattern of the extrusion pressure instruction (U) is to be corrected on the basis of the overshoot amount (OV) or the like, four trial operations are independently conducted, and the criterial manipulated pattern is finally obtained by averaging the time-series patterns of the extrusion pressure instruction (U) which are corrected as a result of the respective trial operations. Alternatively, the trial operation may be conducted with using the time-series pattern of the extrusion pressure instruction (U) which is corrected as a result of the immediately preceding trial operation, as the criterial manipulated pattern.

When four trial operations are independently conducted in the same manner as the embodiments, it is possible to prevent the correcting value from diverging, and hence it is convenient.

In the embodiments, the trial operation is conducted four times. The number of trial operations is not restricted to this. For example, the trial operation may be conducted only one time.

The above embodiments are directed to the case of the control of the extrusion speed of the aluminum extrusion controller 20 or the like. The invention is not restricted to such a case. For example, the invention may be applied to the temperature control of a sealer for heat bonding synthetic resin films.

In the embodiments, as shown in FIG. 2, the aluminum extrusion controller 20 or the like is realized by the CPU 64. Alternatively, the whole of or a part of the portion configured by the CPU 64 may be realized by a hardware logic.

In the control apparatus and the control method according to the invention, the trial manipulated pattern is corrected on the basis of the trial evaluation characteristic value which is extracted from the target controlled pattern, and the trial controlled pattern, the corrected trial manipulated pattern is held as the criterial manipulated pattern, and the manipulated variable is output on the basis of the criterial manipulated pattern.

Therefore, when the control apparatus itself learns the trial operation, it is possible to self-acquire the criterial manipulated pattern. Therefore, the user is not required to generate the criterial manipulated pattern. In other words, the criterial manipulated pattern can easily be generated without requiring expert knowledge of the control.

Furthermore, it is possible to directly know a casual relationship between the trial manipulated pattern and the trial controlled pattern corresponding to the trial manipulated pattern. Therefore, even when the learning of the control apparatus itself is insufficient, the user can easily correct the trial manipulated pattern on the basis of the trial controlled pattern corresponding to the trial manipulated pattern. In other words, the criterial manipulated pattern can easily be generated without requiring expert knowledge of the control.

The learning for generating the criterial manipulated pattern is conducted in a trial operation preceding an actual operation. Unlike the case where the learning is conducted in an actual operation, accordingly, the convergence properties of learning results are ensured. In other words, the criterial manipulated pattern can easily be generated while preventing the learning from oscillating or diverging.

In the control apparatus, the trial correcting value necessary to correct the trial manipulated pattern may be calculated by fuzzy inference.

In this case, the correction of the trial manipulated pattern in a trial operation can be established as a language rule. In other words, the criterial manipulated pattern can be generated more easily without requiring expert knowledge of the control.

In the control apparatus, the trial operation feedback circuit may be provided.

In this case, a trial operation can be conducted under a feedback control, and hence even a person who is not skilled in operation can conduct a trial operation with high reliability. In other words, even a person who is not skilled in operation of the control object can easily conduct the generation of the criterial manipulated pattern.

In the control apparatus, only the criterial manipulated pattern may be supplied to the control object as the manipulated variable in the actual operation.

In this case, in a plant or the like where disturbance can be neglected, a feedforward element can be set as a criterial manipulated pattern which is a time-series pattern of a manipulated variable, and an open loop can be formed only by the criterial manipulated pattern. Accordingly, a transfer element can be set only by generating a criterial manipulated pattern by means of learning. In other words, it is possible to easily determine a transfer element.

In the control apparatus, a feedback signal that is generated based on the controlled variable and the criterial manipulated pattern are supplied to the control object as the manipulated variable in the actual operation.

In this case, in a plant or the like where disturbance cannot be neglected, a feedforward element can be set as a criterial manipulated pattern which is a time-series pattern of a manipulated variable, and a two-degree-of-freedom control system can be formed by a criterial manipulated pattern and a feedback element. Independent from the feedback element, accordingly, the criterial manipulated pattern can be generated by means of learning. In other words, it is possible to easily determine a transfer element.

What is claimed is:

1. A control apparatus which controls a control object by supplying a manipulated variable to the control object so that an output controlled pattern that is a time-series pattern of a controlled variable indicative of a state of the control object approaches a target controlled pattern that is a time-series pattern of a target value of the control variable, said apparatus comprising:

trial pattern holding means for holding a trial controlled pattern that is a time-series pattern of the controlled variable in a trial operation that is performed prior to an actual operation, and a trial manipulated pattern that is a time-series pattern of the manipulated variable corresponding to the trial controlled pattern;

trial evaluation characteristic value extracting means for extracting a trial evaluation characteristic value for evaluating the trial operation, from the target controlled pattern and the trial controlled pattern;

criterial manipulated pattern generating means for correcting the trial manipulated pattern on the basis of the trial evaluation characteristic value so that the trial controlled pattern approaches the target controlled pattern, and for holding the corrected trial manipulated pattern as a criterial manipulated pattern that serves as a criterion of a time-series pattern of the manipulated variable in an actual operation; and criterial manipulated pattern outputting means for outputting the criterial manipulated pattern as at least part of the manipulated variable in the actual operation.

2. The control apparatus according to claim 1, wherein the criterial manipulated pattern generating means calculates, by fuzzy inference, a trial correcting value that is necessary to correct the trial manipulated pattern on the basis of the trial evaluation characteristic value so that the trial controlled pattern approaches the target controlled pattern, corrects the trial manipulated pattern on the basis of the trial correcting value, and holds the corrected trial manipulated pattern as the criterial manipulated pattern.

3. The control apparatus according to claim 1, further comprising a feedback circuit dedicated to the trial operation, wherein in the trial operation the trial operation feedback circuit is connected to the control object whereas the criterial manipulated pattern outputting means is disconnected from the control object, and in the actual operation the criterial manipulated pattern outputting means is connected to the control object whereas the trial operation feedback circuit is disconnected from the control object.

4. The control apparatus according to claim 1, wherein only the criterial manipulated pattern is supplied to the control object as the manipulated variable in the actual operation.

5. The control apparatus according to claim 1, wherein a feedback signal generated based on the controlled variable and the criterial manipulated pattern are supplied to the control object as the manipulated variable in the actual operation.

6. A method of controlling a control object by supplying a manipulated variable to the control object so that an output controlled pattern that is a time-series pattern of a controlled variable indicative of a state of the control object approaches a target controlled pattern that is a time-series pattern of a target value of the controlled variable, comprising the steps of:

obtaining a trial controlled pattern that is a time-series pattern of a controlled variable in a trial operation that is performed prior to an actual operation, and a trial manipulated pattern that is a time-series pattern of the manipulated variable corresponding to the trial controlled pattern;

extracting a trial evaluation characteristic value for evaluating the trial operation, from the target controlled pattern and the trial controlled pattern;

correcting the trial manipulated pattern on the basis of the trial evaluation characteristic value so that the trial controlled pattern approaches the target controlled pattern, and holding the corrected trial manipulated pattern as a criterial manipulated pattern that serves as a criterion of a time-series pattern of a manipulated variable in an actual operation; and outputting the criterial manipulated pattern as at least part of the manipulated variable in the actual operation.

7. The method according to claim 6, further comprising calculating, by fuzzy inference, a trial correcting value that is necessary to correct the trial manipulated pattern on the basis of the trial evaluation characteristic value so that the trial controlled pattern approaches the target controlled pattern, correcting the trial manipulated pattern on the basis of the trial correcting value, and holding the corrected trial manipulated pattern as the criterial manipulated pattern.

8. The method of claim 6, further comprising connecting a feedback circuit dedicated to the trial operation to the control object and disconnecting a criterial manipulated pattern outputting means from the control object when conducting a trial operation, and disconnecting the feedback circuit dedicated to the trial operation from the control object and connecting the criterial manipulated pattern outputting means to the control object when conducting an actual operation.

9. The method of claim 6, wherein only the criterial manipulated pattern is supplied to the control object as the manipulated variable in the actual operation.

10. The method of claim 6, wherein a feedback signal, which is generated on the basis of the controlled variable, and the criterial manipulated pattern are supplied to the control object as the manipulated variable in the actual operation.

* * * * *